US008224170B2

(12) United States Patent
King et al.

(10) Patent No.: US 8,224,170 B2
(45) Date of Patent: Jul. 17, 2012

(54) PHOTOGRAPHIC CONTROL SYSTEM, DEVICES AND METHOD

(76) Inventors: Kevin James King, Vancouver, WA (US); Matthew M Kachevas, Vancouver, WA (US)

(*) Notice: Subject to any disclaimer, the term of this patent is extended or adjusted under 35 U.S.C. 154(b) by 0 days.

(21) Appl. No.: 12/825,270

(22) Filed: Jun. 28, 2010

(65) Prior Publication Data

US 2011/0129207 A1 Jun. 2, 2011

Related U.S. Application Data

(60) Provisional application No. 61/221,083, filed on Jun. 28, 2009, provisional application No. 61/293,145, filed on Jan. 7, 2010.

(51) Int. Cl.
*G03B 17/00* (2006.01)
(52) U.S. Cl. .......................................................... 396/56
(58) Field of Classification Search ..................... 396/56
See application file for complete search history.

(56) References Cited

U.S. PATENT DOCUMENTS

| 7,783,188 B2 * | 8/2010 | Clark | 396/198 |
| 2008/0049110 A1 * | 2/2008 | Arbouzov | 348/211.99 |

* cited by examiner

*Primary Examiner* — Rodney Fuller

(57) ABSTRACT

A control system for use with preconfigured photographic equipment that includes a controllable photographic device controlled by a controlling photographic device is disclosed. The controllable photographic device has a housing, and a device circuit having an upstream portion and a downstream portion coupled by control lines within the housing. An internal module may be located within the housing and includes a signal detecting arrangement configured to be coupled with the control lines between the upstream and downstream portions. The system may also include an external module configured to be located outside of the housing, and coupled with the internal module. The external module may include a signal receiving device capable of receiving a wireless control signal from the controlling photographic device, and to cause a module generated signal to be sent by the internal module to the downstream portion upon receipt of the wireless control signal.

26 Claims, 27 Drawing Sheets

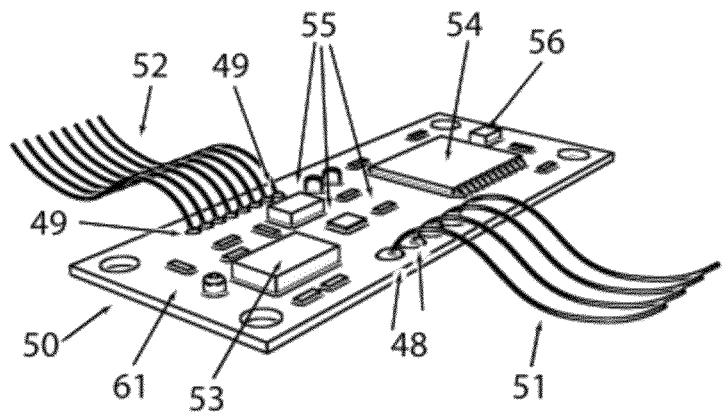
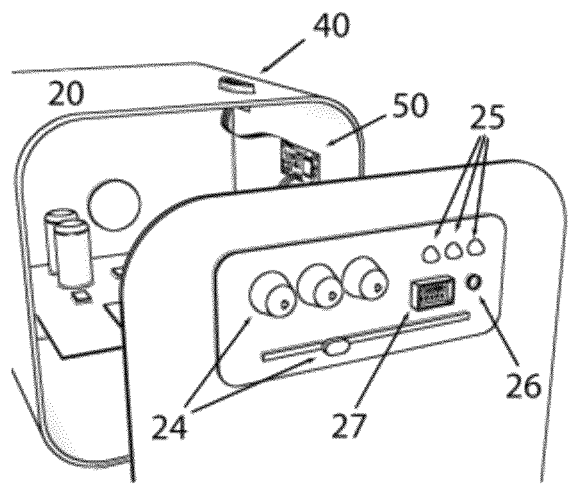
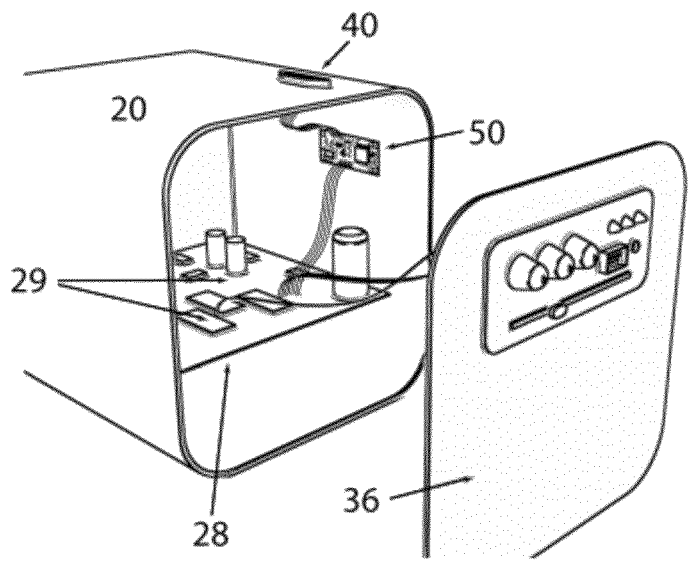

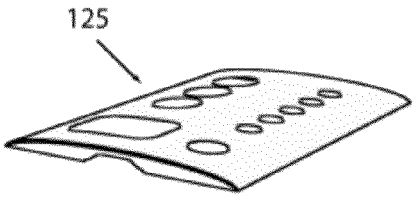
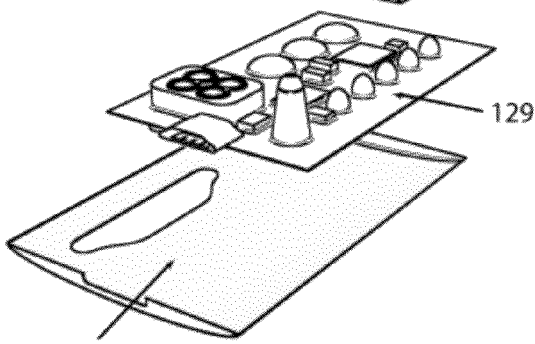
FIGURE 12
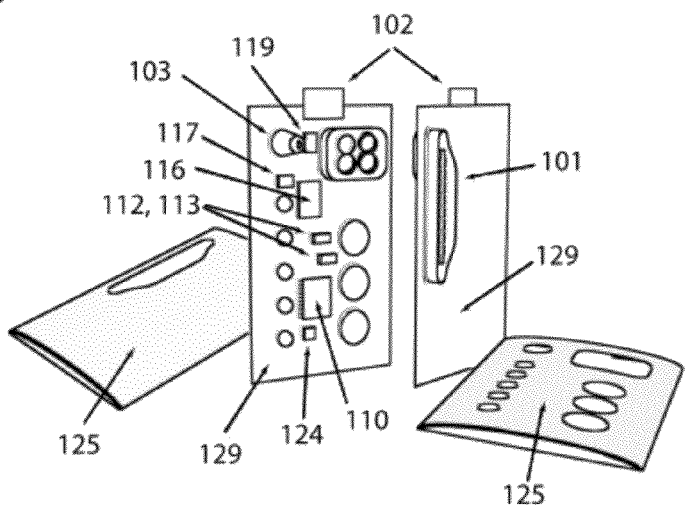
FIGURE 13
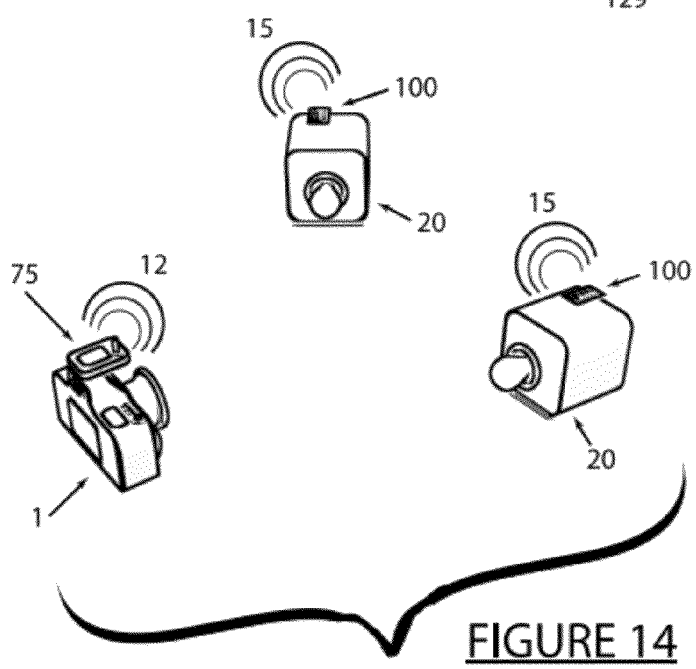
FIGURE 14

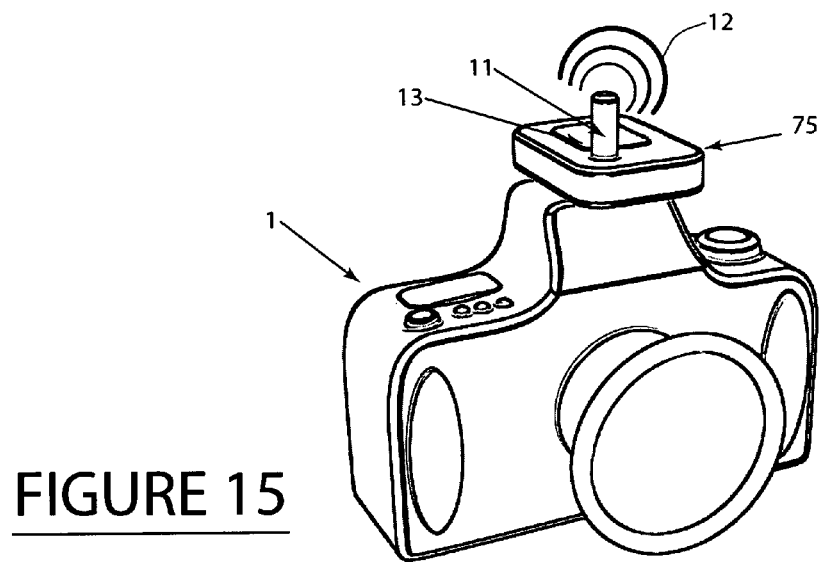
FIGURE 15
FIGURE 16
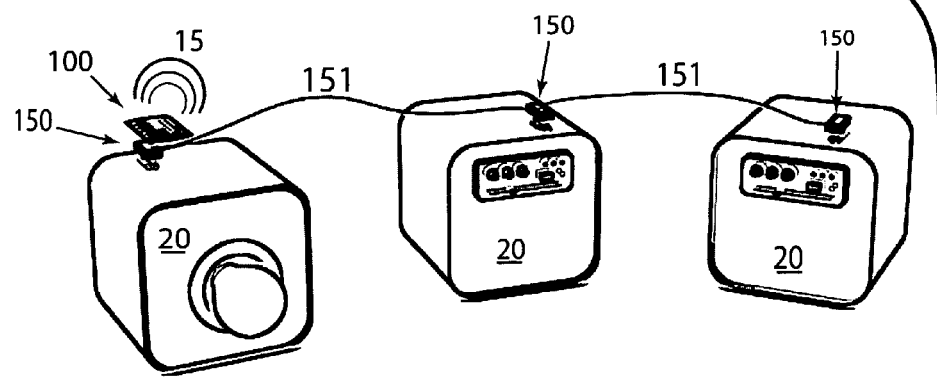

PHOTOGRAPHIC CONTROL SYSTEM, DEVICES AND METHOD

CROSS-REFERENCES TO RELATED APPLICATIONS

This application claims the benefit of U.S. Provisional Patent Application No. 61/221,083 filed Jun. 28, 2009, entitled WIRELESS CAMERA FLASH RADIO DATA MODULE SET and U.S. Provisional Patent Application No. 61/293,145 filed Jan. 7, 2010, entitled DATABASE LICENSING AND CUSTOMER SERVICE SYSTEM FOR RADIO WIRELESS CAMERA AND FLASH SYSTEMS and incorporates the disclosures of those applications by reference.

BACKGROUND

This application relates generally to peripheral devices used in photography systems. More specifically, this application relates to a system, devices, and methods to augment a large number of dissimilar groups of photographic peripheral devices to enable a substantially standardized intercommunication protocol between the peripheral devices and a various cameras, and between the peripheral devices themselves.

BACKGROUND AND SUMMARY

For many years companies have introduced various combinations of radio frequency ("RF") based trigger and control devices which essentially provide a synchronization signal which causes a lighting device to operate in synchronization with an activation of a camera shutter during picture taking. Some devices have gone a step further to include a means to provide basic control functions to the remote lighting via RF such as turning the light emission intensity up or down, fine tuning the Kelvin color temperature of the light, and the like.

Lighting equipment manufacturers attempting to design proprietary RF synchronization into their lights often find that mastering both lighting engineering and RF engineering is costly and time consuming. Complying with FCC (Federal Communications Commission) certification requirements also adds cost and time to development cycles. Often the risk of implementing an inferior radio solution into their lighting devices is too high for many lighting component manufactures.

The industry needs a substantially standardized radio communications system that can be readily implemented by large numbers of potential equipment manufactures and end users. A standardized system would appeal to end customers because there would be an increased chance that purchasing equipment supporting one, or few, standardized protocols would enable them to control a large range of lighting equipment.

Many end users, particularly novices to photography or advanced photographic lighting, find the task of learning to control lighting equipment to be a steep learning curve, which often prevents them from fully understanding the function of their lighting equipment. The existence of a substantially standardized control system would mean an end user would only need to learn a single control system, and that they could be reasonably assured that all similarly configured equipment would function in a similar way.

Photographic peripheral device manufacturers adopting a substantially standardized radio communications system could enjoy "turn-key" type solutions, requiring very low research and development cost, and short time to market. And since end user training time is minimized, a manufacturer's customers would more likely purchase new, and improved, RF enabled products.

In addition, it is estimated that retrofitting peripheral devices could be accomplished in relatively short order. Embodiments in accordance with the present disclosure may be easily and inexpensively configured to work with units currently being designed, and with existing stock units.

The industry also needs a way to maintain control over its own proprietary signaling means and product lines. A standardized RF protocol and hardware may allow individual manufacturers the ability to control access to individual features within their own product while maintaining reasonable assurance that a competing manufacturer could not easily produce a similar or cloned response in their original hardware.

Embodiments in accordance with the current disclosure may include a system of electronic modules. The system may include a first set of modules having a number of subsets which many vary slightly from set to set, and a second set of modules all substantially the same, i.e. without any subsets. Individual units from respective subsets (i.e. from the first set) may be configured to be operatively coupled with respective sets of preconfigured photographic peripheral devices. Individual units from the second set of modules may then be configured to operatively couple with the any module from the first set regardless of which subset it is from.

Each module from the first set may be referred to as an Internal Module, or IM, as it may be disposed internal to a peripheral device. Each module from the second set may be referred to as an External Module, or EM, as it may be physically coupled external to a peripheral device, and as discussed, each EM may be operatively coupled to an IM.

Photographic peripherals generally include at least one controllable feature. As such, peripheral devices will be referred to in this disclosure as "controlled devices", "controlled equipment", or "controllable devices". The External modules EMs may be configured to receive or transmit control signals by, for example, radio frequency, and may be able to convey control signals electrically or optically to or from various types of controllable device via the IMs. The IM and the EM and/or other modules described herein may be circuit boards. In some cases, the circuit boards may be in communication with each other electrically or optically to achieve the desired communication.

The IM may be easily added to lighting equipment during manufacture, retrofitted to units already manufactured or distributed, or attached by an end user via a connector external to the lighting equipment. The IM may be coupled with the controllable device internal to the controllable device, or in an additional enclosure attached to the exterior of the controllable device.

The EM of the present invention may be inexpensively manufactured and may be very small as it may contain minimal circuitry which may be generally non-specific to controlling any given kind of controllable device. The EM may not require its own internal primary power source, as the operating power may be drawn from the IM during operation.

Embodiments in accordance with present disclosure may employ a standardized protocol or a proprietary protocol for sending and/or receiving data and/or control signals between radio links. Each IM and EM may include hardware and may be equipped with software, and/or firmware, which may allow the protocol to be implemented to allow interaction with circuitry internal to the controllable devices.

Embodiments may be configured to provide an efficient and effective IM requiring minimal manufacturing and assembly cost. In many cases various IMs may be constructed to be retrofitted into many different peripheral devices Many photographic peripheral devices may employ a relatively small number of signal lines. In one example, a first peripheral device may include a line to carry a pulse representing an activation, i.e. a trigger pulse, to cause the light to flash and emit light in synchronization with a camera shutter, and an analog voltage reference may be used to control the brightness or intensity of the flash when activated. The space and cost required to implement just the trigger pulse and analog reference voltage may be very minimal.

In another example, a different model of lighting equipment may require a pulse activation line as well as a serial communication line. In this example, a binary serial data signal may be sent to the controllable device representing the desired intensity of the flash. In the second example again, basic internal I/O components that provide the trigger signal and a serial data signal may be small and inexpensive, and simple to design and build.

For at least these reasons, it may be simple and inexpensive to design IM modules in accordance with the current disclosure, i.e. modules containing only the basic required I/O hardware and software to control or activate a specific model of controllable device. Many such IM modules can be rapidly designed specific to a potentially enormous range of controllable devices. Embodiments may enable a given manufacturer of a given controllable device to install an IM while having minimal to no knowledge of radio signaling, and at minimal cost per unit.

Since the IM may be designed specifically for a given controllable device, manufacturers may require little to no retooling or redesign to incorporate the new functionality. The new functionality may also be easily retrofitted into existing stock or even units already in use by their customer base. The manufacturer may continue to sell the same controllable device at the same retail price with no additional markup or minimal markup while enjoying increased sales due to the added value of having a pre-installed, or retrofitted, IM.

On the side of the EM, only a single model or embodiment of EM may need to be designed. The EM may be configured to be extremely small and compact. Since a single EM design may be used across a wide range of controllable device, the EM may be produced in high volume, further reducing cost. There may only be one round of certification and tooling costs. Thus a robust and advanced radio communication device may now be used with a wide range of controllable devices. In addition, a given EM may be quickly moved between any number of controllable devices including widely differing kinds of controllable devices from different manufacturers.

As the EM is likely to be the most expensive part of the system, an end user may purchase the EM only if they require wireless functionality of their equipment. While at the same time, a large portion of equipment may be installed with the much lower cost I/O and hardware specific IM portion of the system.

The EM may include a radio receiver, transmitter, or transceiver capable of conveying control signals wirelessly with other portions of a lighting or control system such as other EM modules attached to other controllable devices, or other wireless devices.

The EM may draw primary power via an electrical connection to the IM via a connector installed in the controllable device. The connector may penetrate the exterior enclosure of the controllable device. The IM may draw its primary power supply via electrical connection to an appropriate voltage and current source inside the controllable device.

Embodiments in accordance with the current disclosure may enable manufactures to assert control over proprietary functions, microprocessors designs, and software code routines, and to limit access thereof to only users who have purchased appropriate licensing. Further, embodiments may enable a given manufacturer to implement advanced functions which may be covered by technologies owned by a second manufacturer. For example, a technology may be rightfully owned by one manufacturer which may make possible an extremely fast discharge of light from a xenon tube. Some photographers shooting very fast stop-motion type images (such as a bullet exiting a gun barrel) may have use for this, but for many others a slower discharge time may be sufficient.

Various embodiments may enable easy licensing of only the number of users actually using the given technology. Thus, the first manufacturer may not have to pass along the cost of the licensing particular feature(s) to all of its customers—rather, only those who would actually use and agree to pay for use of the protected feature(s).

Further, embodiments may enable licenses to be synchronized with a computer system or database external to the EM. A reliable record could be maintained recording the number of licenses currently in use. The record could be referenced by the owner of the protected technology.

In some embodiments, license keys may be stored in the EM. The license keys may grant a given user the ability to control certain types of controllable device, or certain features within the controllable device. A processor may be provided on the IM, and may be configured to execute portions of code or processes which control given functions of the controllable device. However, in some cases the IM may be configured to first check if the appropriate license key is present in the attached EM.

The EM may include a unique digital serial number that may be set during manufacture. The serial number may be difficult to alter or tamper with by an end user. The serial number may be used to uniquely identify the given EM to other systems such as computer systems or remote databases. This serial number may be used to uniquely relate a license key or set of license keys to a specific EM.

The EM may provide a communication coupling for electrically communicating with a computer system. The communication coupling may be, for example, a standard Universal Serial Bus "USB" connector. The EM may use the communication coupling to exchange control signals or license key information with a computer system. The computer system may then use the internet or other network service to poll a remote database and to synchronize the license keys activated in the EM with those paid for, or authorized as reported by the database. Thus, embodiments may enable the remote management and licensing of features available to the IM of the present invention. The features may be licensed differently for each model, manufacturer, or type of controllable device. The EM may also use the USB port to receive power, for charging/recharging.

The hardware and protocol of various embodiments and the substantially standardized EM may make it possible for the EM to also function as a "digital keychain" or "hardware lock" for various features or functions of a lighting device, or a camera device, or the like. The digital keychain functionality may be easily transported by the user between locations and between different setups of controllable device. Embodiments may also make possible the interaction with control signals or functions of a lighting device or camera device by way of a compatibly built control device in the form of the IM which is specific to a given type of controllable device at very low cost.

Embodiments according to the current disclosure thus may provide for several key needs sought by the industry's end users, as well as the industry's equipment manufacturers. Firstly, embodiments may provide a substantially standardized control system, with the potential for wide acceptance, which may be operable across many makes, models, and brands of controllable device, and that may have a low cost of implementation for manufacturers of controllable device. Secondly, the manufacturers may choose to license their own internal proprietary features on a user by user basis while at the same time providing a substantially standardized and widely accepted communication system to a diverse user base.

In particular, this application discloses a control system for use with preconfigured photographic equipment. In some embodiments, the control system may include a controllable photographic device controllable by a controlling photographic device. The controllable photographic device may have a housing, a controllable device circuit may be included substantially within the housing and may have an upstream portion and a downstream portion coupled by one or more control lines. The control system may also include an internal module physically located substantially within the housing and including a signal directing arrangement. The signal directing arrangement may be electrically and logistically coupled with the one or more control lines between the upstream portion and the downstream portion. The control system may also include an external module configured to be physically located substantially outside of the housing, and further configured to be electrically and logistically coupled with the internal module. The external module may include a signal receiving device capable of receiving at least one wireless control signal from the controlling photographic device, and to pass at least one second control signal to the downstream portion of the controllable device via the internal module in order to effect a predetermined output by the controllable photographic device.

The least one second control signal may be generated by the external module, and or the internal module, and may be modified by one or both modules and/or received by one or more components on either or both modules wherein the same or other components on either or both modules may send one or more corresponding signals in response thereto. In some cases the external module and the internal module may be configured to pass the at least one wireless control signal, and/or the wireless control signal converted for a wired, and/or optical transmission essentially unchanged to the downstream portion of the downstream portion of the controllable device in order to effect the predetermined output.

The upstream portion may include, but may not be limited to elements included in the device circuitry. The elements may be configured to accept, and/or process and/or pass through an input from a user, or other driver of an action, such as, for example, the pressing of a button or the adjustment of a setting, or the like. The downstream portion may include, but may not be limited to elements included in the device circuitry that may be configured to perform, or cause to be performed, those actions called for by the upstream elements, such as, for example, an increase/decrease in a flash power output, or the like.

In some embodiments, the controllable photographic device, and the controllable device circuit, may begin as a preconfigured piece of proprietary photographic equipment designed and/or manufactured by a first company. In some cases, a second company may modify the preconfigured piece of proprietary photographic equipment by coupling the internal module with the controllable device circuit.

In some cases, the controlling photographic device may be a camera, and the controllable photographic device, may be a light source. In some cases the controlling photographic device may be any signal transmitting device that may be capable of transmitting at least one wireless control signal. In some cases the signal transmitting device may be coupled with and/or mounted on a camera.

In some cases, the controllable photographic device, may be one or more controllable photographic devices selected from the group consisting of:

a still photographic camera, a video cameras, a motion film camera, a camera flash unit, a studio strobe unit, a power flash pack, a constant lighting unit "hot light", an LED array unit, a camera, a light meter, a lighting positioning apparatus, a camera positioning apparatus, a microphone, an audio monitor speaker, head phones, a sound mixing board, an electronic music instrument, audio filtering hardware, video filtering hardware, stage effects, visual effects, pyrotechnic processing equipment, and a pyrotechnic control system.

The internal module may include a processor configured to execute one or more instructions, each of the one or more instructions may be configured to cause the controllable photographic device to execute corresponding preselected actions. The external module may includes a memory for storing a license key, the license key configured to determine which if any of the preselected one or more instructions are authorized to be executed.

The external module may include a coupling configured to couple with a computing device. The coupling may be, for example a USB socket, or the like.

The control system may also include one or more discontinuities respectively formed on the one or more control lines between the upstream portion and the downstream portion. The signal directing arrangement may include a first group of one or more lines respectively coupled to the one or more control lines between the upstream portion and the one or more discontinuities. The signal directing arrangement may also include a second group of one or more lines respectively coupled to the one or more control lines between the downstream portion and the one or more discontinuities. The one or more discontinuities may be formed in the one or more control lines by, for example the second company. The one or more discontinuities may be formed as one or more trace cuts in a printed circuit board including the device circuit, or as one or more cuts in one or more wires, or cables or the like.

The control system may also include a switching arrangement electrically disposed between the first group of one or more lines and the second group of one or more lines. The switching arrangement may be configured to selectively connect either the upstream portion to the downstream portion, or the external module to the downstream portion.

In some cases the controllable photographic device may be a plurality of controllable photographic devices each from a particular one of two or more subsets of controllable photographic devices. Each subset of controllable photographic devices may have one or more subset specific features that may differ from one or more features from another subset of controllable photographic devices. The internal module may be a plurality of internal modules each from a particular one of two or more subsets of internal modules. Each member of a particular subset of internal modules may include subset specific features configured for operable compatibility with any member of a corresponding subset of controllable photographic devices. In addition, the external module may be a plurality of external modules each configured to electrically and logistically couple with any internal module regardless of which subset of internal modules the internal module may be a member of.

Embodiments may also provide a photography system. The photography system may include a first set of first control modules including two or more first module subsets comprised of individual first control module members. Each first control module member may have subset specific features configured for operable coupling with any member from a corresponding subset of controllable photographic devices. The photography system may also include a second set of second control modules each substantially identically configured and each configured to electrically and logistically couple with any first control module member regardless of which of the two or more first module subsets the first control module is a member of. Each of the second control modules may be configured to receive one or more first control signals from a controlling photographic device and to send a corresponding one or more second control signals, based on receipt of the one or more first control signals, to the controllable photographic device member via the first control module that the second control module is coupled with.

Each controllable photographic device may include device circuitry which may have an upstream portion and a downstream portion. Each first control module may be coupled to a corresponding controllable photographic device between the upstream portion and the downstream portion. The one or more second control signals may be sent to the downstream portion and may be configured to be interpreted by the downstream portion as if the one or more second control signals was sent by the upstream portion.

Each controllable photographic device may include a housing. One of the first control modules may be located substantially within the housing, and one of the second control modules may be located substantially outside of the housing.

The photography system may also include a connector disposed within an opening in the housing of at least one controllable photographic device. The connector may be electrically and/or logistically coupled at an interior side thereof to the one of the first control modules, and the connector may include a socketed exterior side for socketed coupling with any of the second control modules.

Some embodiments may provide a preconfigured controllable photographic device modification. The controllable photographic device may be of the type having preconfigured device circuitry having an upstream portion coupled to a downstream portion via one or more control lines. The modification may include a wireless signal receiving arrangement configured to recognize receipt of a control signal from a controlling device. The modification may also include a signal directing arrangement coupled with the one or more control lines between the upstream portion and the downstream portion. The signal directing arrangement may be configured to send an arrangement generated signal to the downstream portion upon receipt of the control signal from the controlling device. The arrangement generated signal may be configured to elicit a predetermined response from the controllable photographic device wherein the arrangement generated signal may be interpreted by the downstream portion as a preconfigured device signal sent from the upstream portion.

The modification may also include a signal line intercept arrangement coupled with the one or more control lines, and configured to intercept preconfigured device signals intended to pass from the upstream portion to the downstream portion via the one or more control lines.

The signal line intercept arrangement may be further configured to receive one or more state signals from the downstream portion indicative of a state the downstream portion is in The signal line intercept arrangement may also be configured to send a corresponding state signal to the upstream portion to achieve a state correspondence between the downstream portion and the upstream portion.

The modification may also include one or more discontinuities respectively formed in the one or more control lines. A first set of one or more signal lines may be respectively coupled to the one or more control lines between the upstream portion and the one or more discontinuities. A second set of one or more signal lines may be respectively coupled to the one or more control lines between the downstream portion and the one or more discontinuities.

In some embodiments, the controlling device may be a camera, and the controllable device, may be a light source. In some embodiments, the controllable device, may be a still photographic camera, a video cameras, a motion film camera, a camera flash unit, a studio strobe unit, a power flash pack, a constant lighting unit "hot light", an LED array unit, a camera, a light meter, a lighting positioning apparatus, a camera positioning apparatus, a microphone, an audio monitor speaker, head phones, a sound mixing board, an electronic music instrument, audio filtering hardware, video filtering hardware, stage effects, visual effects, pyrotechnic processing equipment, or a pyrotechnic control system.

The signal directing arrangement may be substantially may be included in an internal module physically located within an external case of the controllable device. The modification may include an external module coupled with an external surface of the external case, the external module configured to receive the control signal from the controlling device and to send a corresponding signal to the internal module.

The internal module may be a first internal module and may be a member of a first internal module subset. Each member of the first internal module subset may include first internal module features configured for operable coupling with a first subset of controllable photographic device. The modification may also include a second internal module, wherein the second internal module may be a member of a second internal module subset. Each member of the second internal module subset may include second internal module features configured for operable coupling with a second subset of controllable photographic device. The first internal module features may be different than the second internal module features. The external module may be two or more external modules each configured to logically and electrically couple with either the first or the second internal modules.

Various embodiments may provide a method of enabling an intercommunication protocol between one or more controlling photographic devices and two or more controllable photographic devices, wherein the two or more controllable photographic devices may include a mix of at least a first design type of controllable device and a second design type of controllable device. The method may include:

configuring a first set of internal modules each to be electrically and logistically coupled with one or more controllable photographic devices of the first design type;

configuring a second set of internal modules each to be electrically and logistically coupled with one or more controllable photographic devices of the second design type;

configuring each of a plurality of external modules to receive a wireless control signal from the one or more controlling photographic devices, further configuring each of the plurality of external modules to be electrically and logistically coupled with any internal module from either the first set of internal modules or the second set of internal modules in order to enable a module control signal to be sent from the internal module coupled with external module to the controllable photographic upon receipt of the wireless control signal by the external module.

The first control signal may be a one or more wireless control signals. The second control signal may be one or more signals transmitted through a wired, or a wireless connection.

The system may utilize and/or generate a number of control signals. A first control signal may be one or more wireless control signals sent from (or received by) the controlling device to (or from) the external module. A second signal may be a first module signal sent from (or received by) the external module to (or from) the internal module. A third signal may be a second module signal sent from (or received by) the internal module to (or from) either upstream or the downstream portions of the device circuit. A fourth signal may be called a device signal and may include signals the upstream and downstream portions may send and/or receive to and from each other, or other components described herein. In addition status signals may be sent between the components described herein.

The controllable photographic devices may include a device circuit including an upstream portion connected to a downstream portion by one or more control lines. The controllable photographic device may be configured such that a device signal sent from, or passing from, the upstream side to the downstream side may elicit a response from the controllable device.

In some cases the method may also include: configuring each of the internal modules to include a processing device to generate the module control signal; including a signal directing arrangement in each of the internal modules wherein the signal directing arrangement connects the processing device to the downstream portion of the device circuitry; and configuring the external module to query a status state of the controllable device via the internal module, and to save results of the query with the processing device. The status state may be one of a battery level, an ambient temperature of the controllable device, and a recycle state.

The method may also include determining a signal pattern preconfigured to be sent from the upstream portion to the downstream portion and/or from the downstream portion to the upstream portion, saving the signal pattern with the processing device, and at a later time using the signal pattern elicit the response from the controllable device.

In some cases, the method may also include forming a discontinuity along one or more control lines included in a device circuit of each of the controllable photographic devices. The one or more control lines, prior to the forming of the discontinuity, may connect an upstream portion to a downstream portion of the device circuitry such that, prior to the forming of the discontinuity, a device signal sent from, or passing from, the upstream side to the downstream side may elicit a response from the controllable device. The method may also include coupling one of the internal modules to the one or more control lines between the upstream side and the downstream side.

BRIEF DESCRIPTION OF THE DRAWINGS

The drawings, when considered in connection with the following description, are presented for the purpose of facilitating an understanding of the subject matter sought to be protected.

FIG. 2 is a perspective view of an example Internal Module (IM) than may be included in the system illustrated in FIG. 1;

FIGS. 3-5 are perspective views illustrating how an Internal Module (IM) may be installed into a controllable device;

FIGS. 12 and 13 are perspective exploded views illustrating various example subassemblies that may be assembled to form an example EM.

FIG. 14 is a perspective view of an example system in accordance with the current disclosure;

FIG. 15 is a perspective view of the camera in the system shown in FIG. 14 illustrating some additional features of the system;

FIG. 16 is a perspective view of an example system wherein a plurality of example controllable devices are daisy chained together by wires or cords, and wherein a single EM may be configured to communicate with and control all or most of the controllable devices each having an IM installed therein;

FIG. 24 is a perspective view of the Auxiliary Module installed;

DETAILED DESCRIPTION

While the present system, devices and method, are described with reference to several illustrative embodiments described herein, it should be clear that the present invention should not be limited to such embodiments. Therefore, the description of the embodiments provided herein is illustrative of the present invention and should not limit the scope of the invention as claimed. In addition, while the following description references drawings showing particular configurations and proportions, it will be appreciated that the invention may be configured to have other configurations and proportions.

The description may use perspective-based descriptions such as up/down, back/front, and top/bottom. Such descriptions are merely used to facilitate the discussion and are not intended to restrict the application of embodiments of the present invention.

Figure 1:
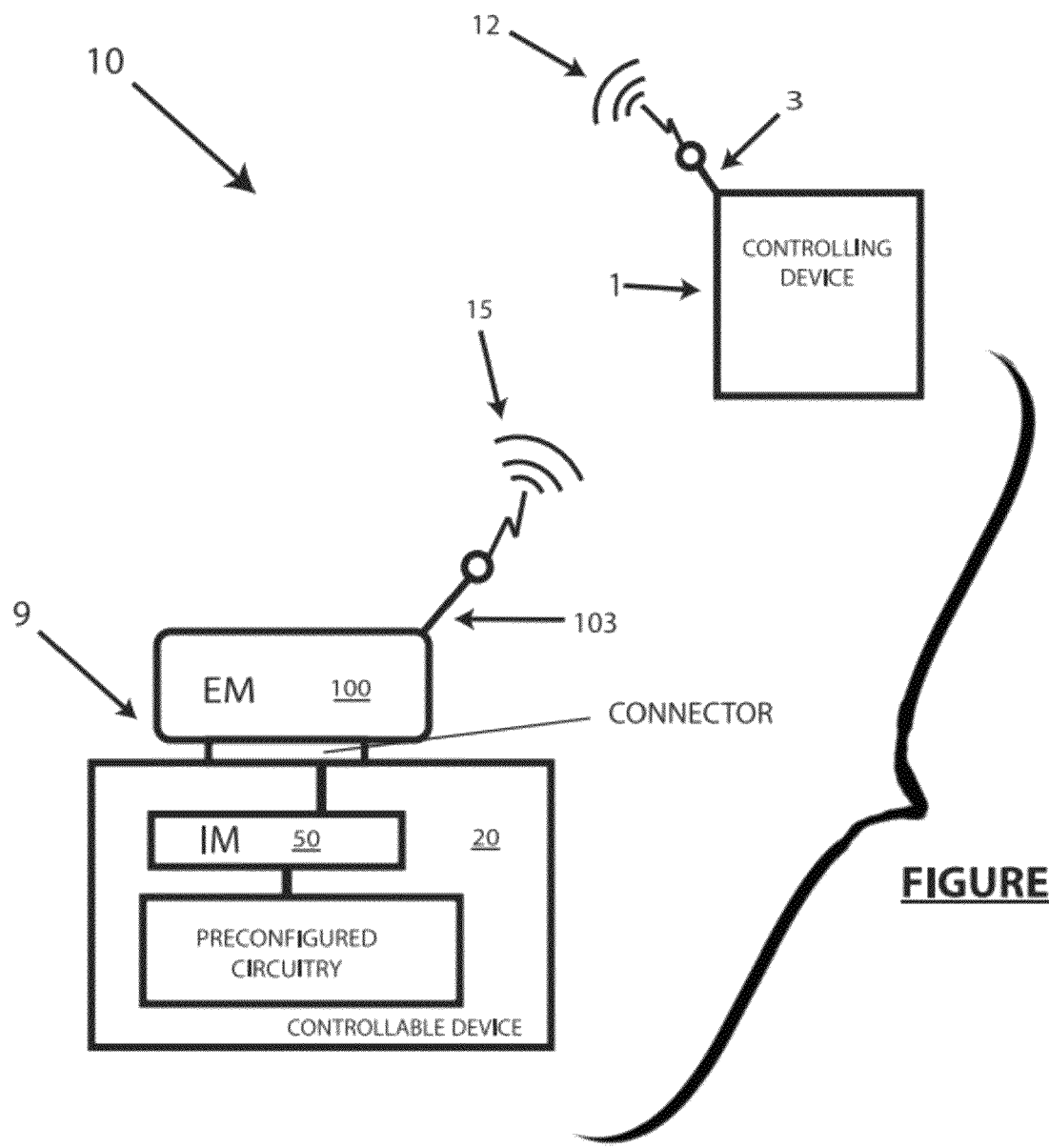
FIG. 1 is a schematic view of a first embodiment of a system for controlling a photographic peripheral device.
Figure 5:
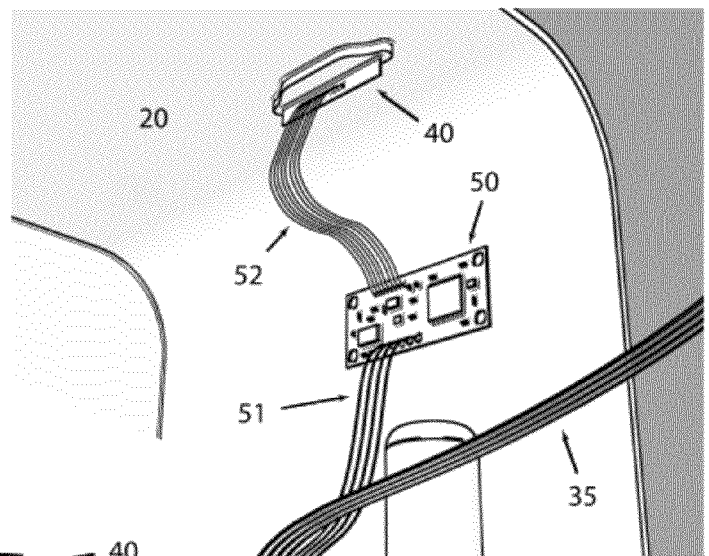

FIG. 1 is a schematic diagram generally illustrating an example system 10 for controlling a piece of controllable equipment, or a controllable device 20 in accordance with the current disclosure. The system 10 may be configured to include two primary physical component assemblies 50,100 which, when electrically connected to each other, may form a circuit 9. The circuit 9 may be capable of: sending or receiving substantially useful status or control data or other signals to characteristic electrical connections inside the controllable device 20; sending or receiving signals by radio frequency; drawing primary operating power for both assemblies 50, 100 from a source internal to the controllable device 20; providing a coupling by which two microprocessors, one located on the first component assembly 50, and one located on the second component assembly 100 may communicate information or control signals between each other. The first component assemblies 50 may be referred to as an "Internal Module", or "IM" 50, and the second component assemblies 50 may be referred to as an "External Module", or "EM" 100.

The EM 100 may be coupled for communication with a controlling device 1, such as a camera for example, via respective antennas 103 and 3. The EM 100 may communicate with the controlling device 1 using for example data packets 15, 12 sent by, for example, radio waves.

In some cases the one or both of the component assemblies 50/100 may have a means of recording a digital serial number; and one or both of the component assemblies 50/100 may include software capable of referencing individual functions to a table of license keys. The list of functions and/or the license keys may be stored on either or both of the component assemblies 50/100.

Figure 17:
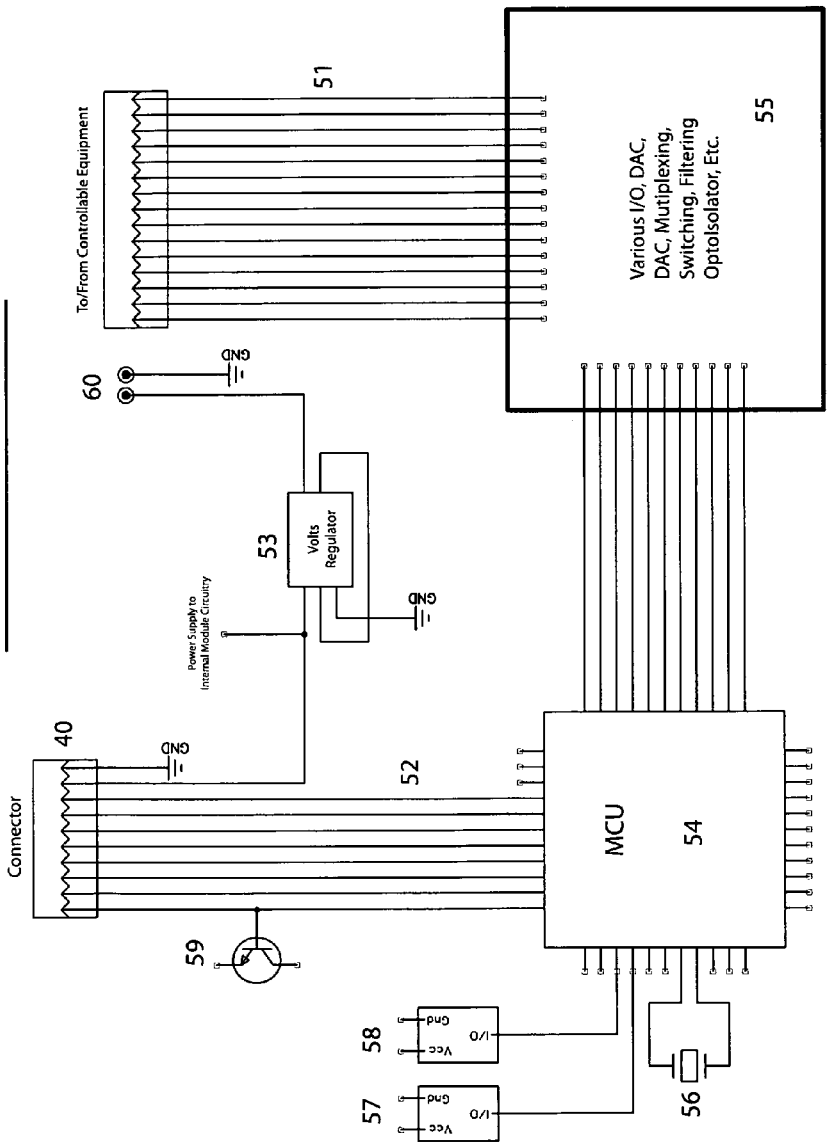
FIG. 17 is a schematic view illustrating an example electrical layout of the IM.

FIG. 2 is a perspective view illustrating an example physical layout of an IM 50, and FIG. 17 is a schematic view illustrating an example electrical layout of the IM 50. The IM 50 may include circuitry 55 designed to handle characteristic input and output signals used by a specific make and model of controllable device 20, and signals used by an External Module, EM 100.

The internal module 50 may be configured to have a specific size, and specific signaling capabilities, in order to physically, electrically, and logically couple with a given make and model of controllable device 20.

The IM 50 may include I/O and signaling hardware 55 required to interface with any desired number of functions inside the controllable device 20. The amount of hardware 55 may be minimal and may be substantially customized in order to minimize at least material costs associated with the IM 50 portion of the system. The IM 50 may include electrical connections 51 which when installed may connect to an appropriate characteristic power source 60 which may be internal to the controllable device 20. The power source 60 may be the primary power supply. In some cases, the IM 50 may be provided with a battery power supply, or a charged capacitor, or the like, for its own primary operating power, for backup power to retain settings, or to wake from a power down mode when the primary power source internal to the controllable device is not available. Backup power supply is not depicted in the FIGS, although providing a backup power is possible without departing from scope of the present disclosure. The IM 50 may also include a voltage regulator 53.

Figure 6:
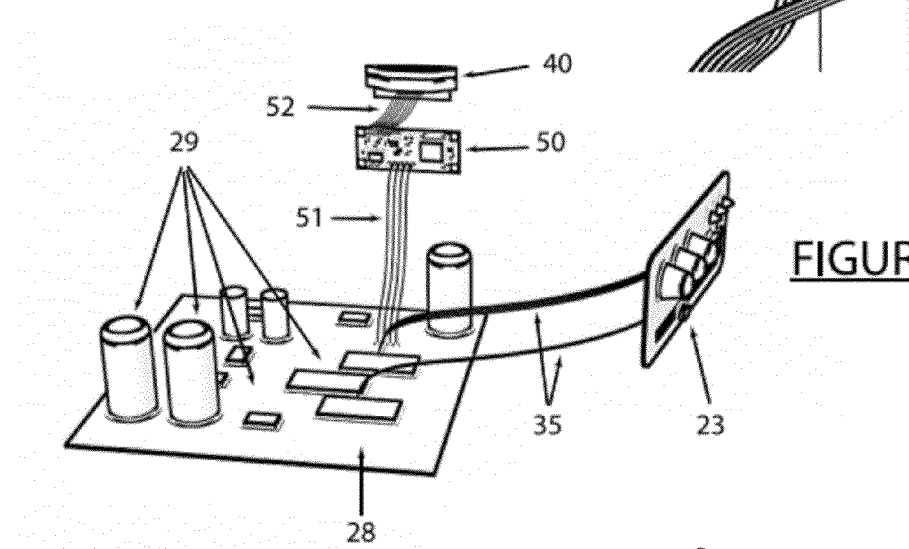
FIGS. 6 & 7 are perspective views illustrating how an Internal Module (IM) may be installed into a controllable device with the external casing of the controllable device removed for clarity.
Figure 7:
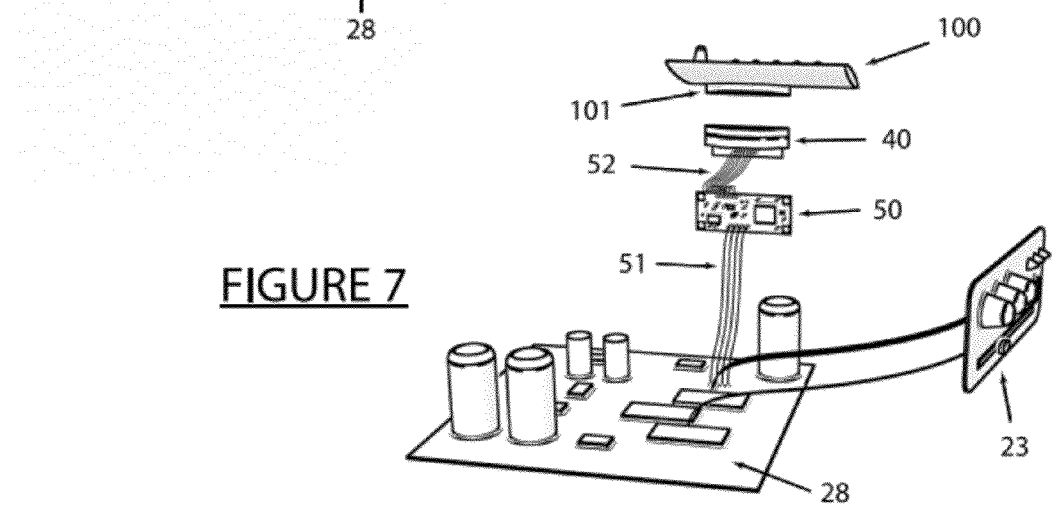

FIGS. 3-7 are perspective views illustrating how an IM 50 may be installed into a controllable device 20. In FIGS. 6 & 7 the external casing of the controllable device 20 is removed for clarity. FIGS. 3-7 also illustrate how the IM 50 may be electrically coupled with the controllable device 20, and with an external connector 40. FIG. 7 also shows how an EM 100 may couple with the external connector 40.

The Internal Module 50 may include a first set of pads or connectors 48 (FIG. 2) which may be used to connect wires 51 or other electrical conductor connectors or pins. The IM 50 may include a suite of I/O or signaling lines 51 which may be used to electrically connect to various characteristic electrical locations inside the controllable device 20 via the first set of pads or connectors 48. The figures of this disclosure generally depict only four signal lines 51, though depending on the complexity of the controllable device, more or fewer lines may be used. Some embodiments may require a hundred or more conductors 51 to interface with the desired signals or data busses within the controllable device 20.

The IM 50 may also include a second set of pads or connectors 49 (FIG. 2) which may attach to the internal side of the external connector 40 directly or via wires 52. The external connector 40 may penetrate the physical enclosure of the controllable device 20, and may provide a convenient point of attachment for an EM 100. The EM 100 may then be connected to the exterior of the controllable device 20. The IM 50 may supply power to the EM 100 via specified characteristic pins on the exterior connector 40. The connector 40 may be an electrical pressure connector 40.

Figure 8:
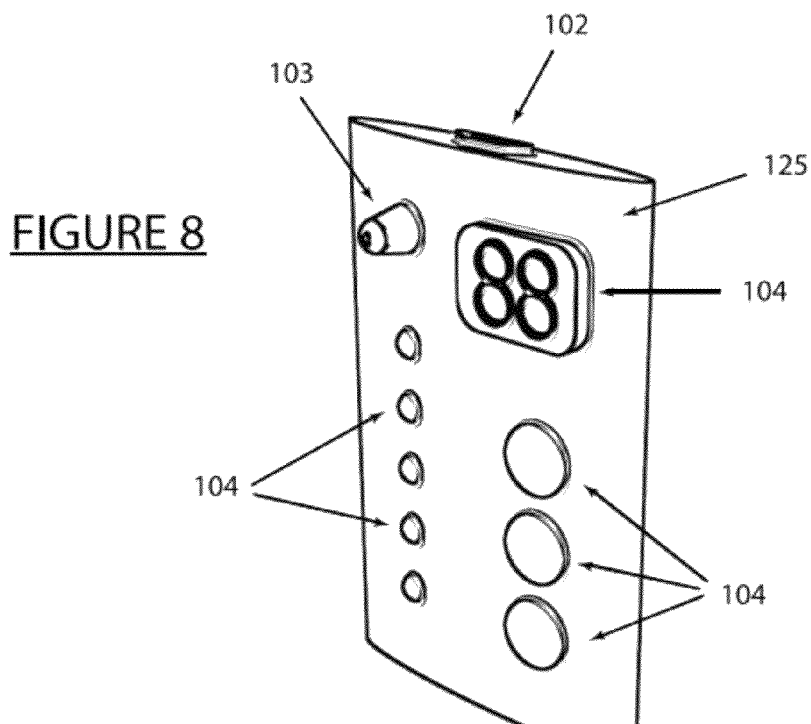
FIG. 8 is a front perspective view illustrating an example External Module (EM)
Figure 9:
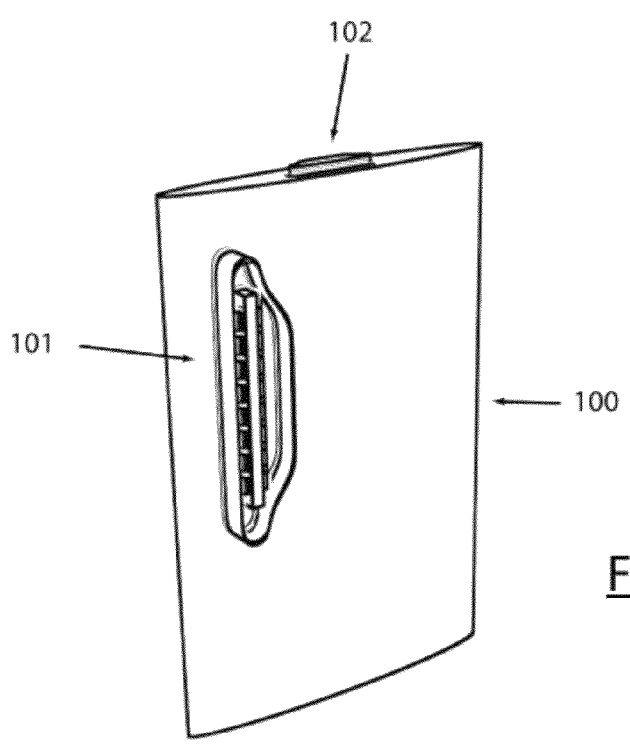
FIG. 9 is a rear perspective view illustrating the example External Module (EM) shown in FIG. 8.
Figure 10:
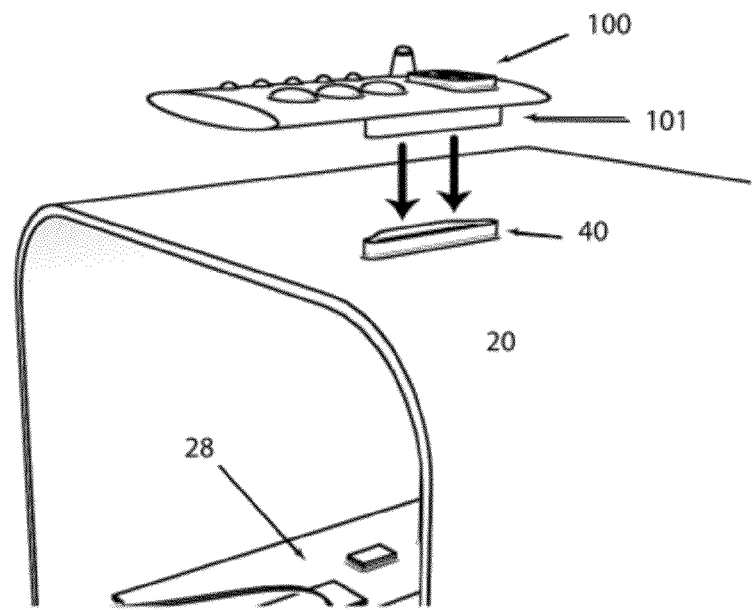
FIG. 10 is a perspective views illustrating an External Module (EM) about to couple with an Internal Module (IM) installed inside a controllable device via respective connectors.
Figure 11:
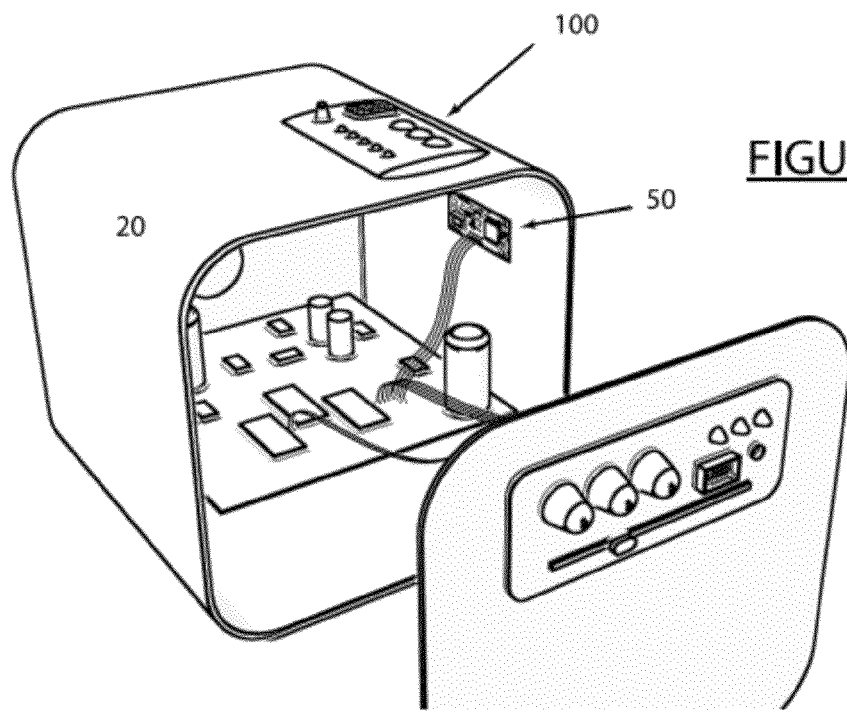
FIG. 11 is a perspective views illustrating an External Module (EM) coupled with an Internal Module (IM) installed inside the controllable device via respective connectors.

FIG. 8 and FIG. 9 are respective front and rear perspective views illustrating an example physical layout of the EM 100. FIG. 10 and FIG. 11 are perspective views respectively illustrating an EM 100 about to couple with and coupled with the IM 50 via connectors 101 and 40. FIGS. 12 and 13 are perspective exploded views illustrating various example subassemblies that may be assembled to form an example EM 100.

The conductors 52 of the IM 50 may exit the exterior enclosure of the controllable device 20 via pressure connector 40, to which mating part 101 may be easily joined. The pressure connector 40 may be capable of holding several ounces to several pounds of stress without disconnecting. This may make it possible to securely mount the EM 100 to the exterior of the controllable device 20 without any need of additional connectors or adhesion. In some examples, connectors 101, 40, and/or physical enclosures of an EM 100 and controllable device 20 may include a magnet and a material to which the magnet is attracted, whereby the connectors 101 and 40 may be held in contact with each other by the magnetic attraction between the devices, instead of, or in addition to, the pressure connector 40. Any other connector may be used such that a multi conductor cord may be connected between the connector 40 and the EM 100.

FIG. 14 is a perspective view of an example a system 10 in accordance with the current disclosure, and FIG. 15 is a perspective view of the camera 1 in the system 10 illustrating some additional features of the system 10. The system 10 may include first and second controllable devices 20 each having an EM 100 coupled thereon. Each of the controllable devices 20 may also have an IM 50 (not visible in the figure) installed therein and operatively coupled with the EMs 100. The system 10 may include a camera 1, or camera system, configured as a controlling device, having a wireless controller 75 mounted to it and configured to communicate with the EM 100 via data packets 12, 15. Other example systems may include any number of controllable devices 20.

Figure 18:
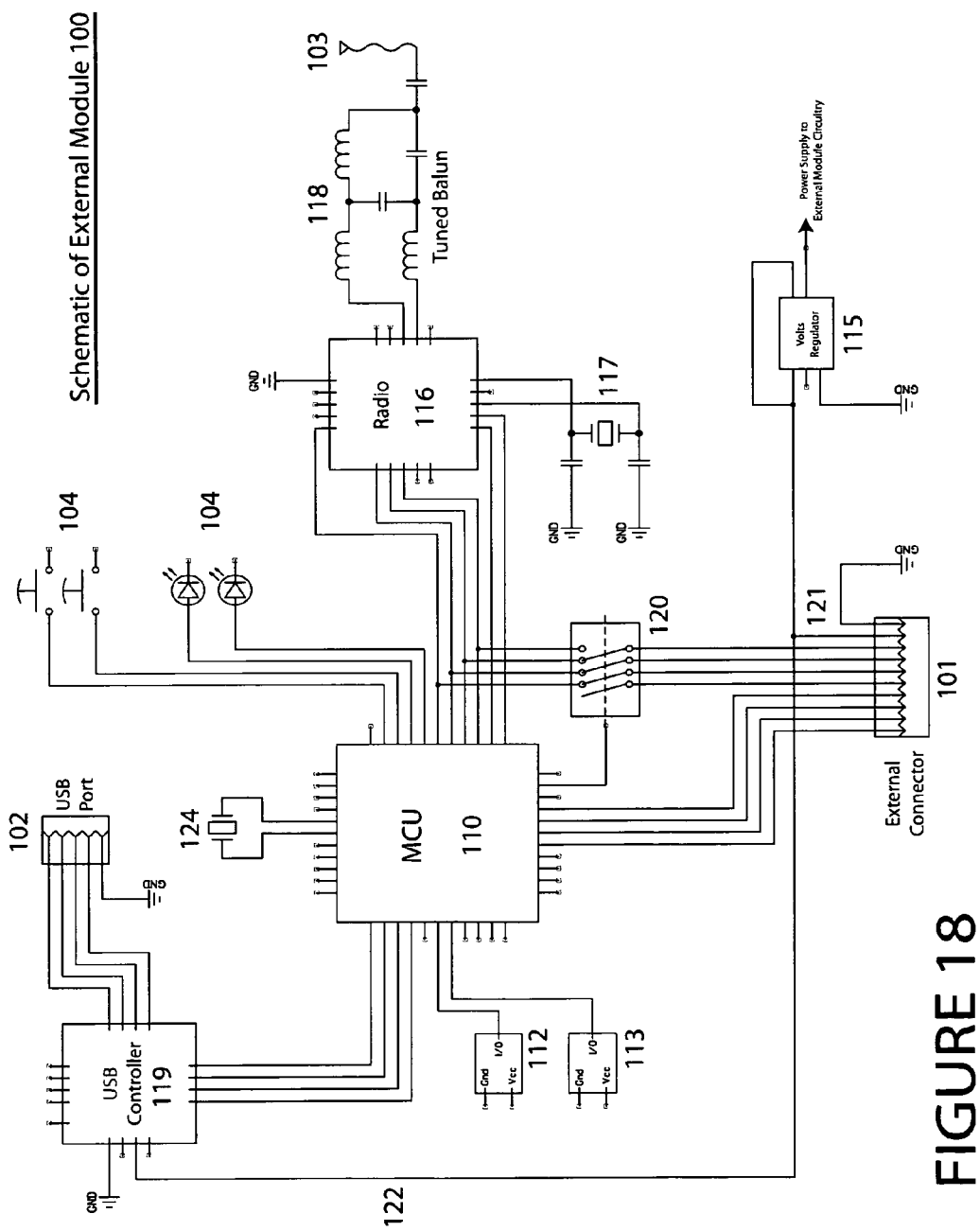
FIG. 18 is a schematic view illustrating an example electrical layout of the EM.

FIG. 18 is a schematic view illustrating an example electrical layout of the EM 100. Referring now to FIGS. 17 and 18, the conductors 52 between the IM 50 and EM 100 via the external connector 40, and connector 101, may include one or more of the following: A common ground, negative reference, voltage source 121 that may be capable of sourcing any current required by the EM 100, an immediate action trigger line 59, and a serial data communication means which may be in the form of any of a Serial Peripheral Interface ("SPI"), I squared 'C', ("I2C"), Universal Serial Bus ("USB"), FireWire ("IEEE"), parallel interface, RS-232, or other serial communication protocol including any non-standard proprietary signaling protocols. The EM 100 may also include a radio module 116, a software license key module 112, 113, and in some cases a communication coupling with a computer system such as a USB port 102.

Crypto/software license key module may also include any combination of the following parts as appropriate. Note the parts listed may perform slightly different functions, some may function as memories, some may be designed to hold permanent keys, some may be designed to purely authenticate an internal part to an external part, etc. Various levels of authentication and/or key storage may be carried out depending on the specific arrangement of the devices.

In some cases parts identified with the following part numbers may be used in various arrangements in place of items 57, 58, 112, and 113 in the specification: AT88SC018, AT88SC0404CA, AT88SA100S, AT88SA102S, and AT88SA10HS. The part ending in "CA" may be used to securely store digital keys. All are currently available commercially from Atmel Corporation.

The EM 100 may include a processing suite that may include a processing device such as a microprocessor 110. Similarly, the IM 50 may include a processing suite that may include a processing device such as a microprocessor 54. The processing suite may enable the EM 100 to communicate with the processing suite of the IM 50 using various communication methods, for example a characteristic pattern of digital or analog signals.

One example communication method may use digital parallel or serial standards, interfaces, or protocols such as SPI, I2C, RS-232, or the like. Using serial busses, for example, may provide sufficient speed for the intended application and may require fewer conductor pins on the external connectors 40 and 101 compared to parallel busses.

A protocol may be devised, according to the current disclosure, whereby an EM 100 may command a wide range of possible signals, controls, or outcomes to an IM 50. The processing suite 54 of the IM 50 may then act on those commands from the EM 100 by activating the equipment specific I/O portions 55 of the IM 50 which may cause a desired response from the controllable device 20.

For example, let's assume a given photographic light 20 is responsive to two analog voltages for setting its power or brightness level. One analog voltage may set the amount of light to be emitted by a xenon flash tube 22 when the photograph is taken, and the other analog voltage may set the brightness of a constant-on modeling lamp 21.

In one of many possible examples, a protocol may be devised for communication between the MCU 110 of an EM 100 and the MCU 54 of an IM 50. The protocol may use an 8-bit command followed by a 16-bit argument. The first byte, may be a possible value between 0 and 255, and may represent a command. Let's assume the values 200 through 209 are reserved to command the setting of up to 10 different analog voltage lines. Lets also assume the 16 bit argument represents the desired set-point of the voltage in millivolts, thus a voltage of between 0 and 65,535 millivolts may be commanded, which may translate to a voltage between 0 and 65 volts with very high precision. Let's assume the command 200 is always referenced to a primary power emission voltage reference, and the command 201 is always referenced to a modeling lamp setting voltage reference.

For example, if it is desired to set the primary light emission power reference to a level of 3.8 volts, a command of 200 sent as an 8-bit binary sequence, followed by the 16-bit binary sequence representation of the integer 3800 may be sent. If the protocol sent a packet of 3 bytes from the MCU 110 of the EM to the MCU 54 of the IM via signal lines 52 and external connectors 40 and 101 as follows:

200, 14, 216 Binary is: 11001000, 00001110, 11011000, Hexadecimal is: 0x0C80ED8, then the MCU 54 of the IM 50 may know to drive its output referenced to a given set of pins corresponding to the voltage to which the main flash emission power level of the controllable device 20 may be responsive. The MCU 54 of the IM 50 may also use a digital to analog converter 55 to create a voltage of 3800 millivolts which is equal to 3.8 volts.

In a similar way, as another example, 8-bit commands from 210 to 219 could represent the same voltages, but instead, those commands may take an 8-bit argument corresponding to a percentage of minimum to maximum power. So if it was desired to set the light emission power of the main flash tube to 50% of its total possible level, a packet of two bytes could be sent as follows:

210, 128

The MCU 54 of the IM 50 may be specifically programmed with the minimum and maximum levels of the characteristic signals used to drive the given controllable device and thus, it may know that a reference voltage of 5 volts causes the light to emit at full power, while a reference voltage of 0 volts causes the light to not emit light at all. The MCU 54 may then receive the above short packet and perform the math that 128 is 50% of 255, and a reference voltage that would force the controllable device to emit at 50% power would be 2.5 volts. The IM 50 may then cause its digital to analog components 55 to create the required 2.5 volts reference voltage.

It is also noted that even if the same EM 100 is attached to a completely different model of controllable device 20 which has installed an IM 50 which has various I/O components 55 configured to communicate with this different design of controllable device 20, such as, for example, a different model of light, the same command and argument byte sequences described above, when sent from the EM 100 may still produce the same desired result within the different controllable device. The MCU 54 of the IM 50 installed in the different controllable device may be programmed such that the same commands would be able to logically produce the desired signaling within the different controllable device to achieve the desired effect or function.

As discussed, various embodiments may implement a protocol of short packets or commands which may be used to drive any of, for example, 10 analog voltages to exact voltages, or a voltage representative of the desired power setting of the controllable device. Thus, using a protocol as discussed above, a single EM 100 may have the ability to communicate data streams and commands that may be useful to a multitude of different specific IMs 50 which may be installed in different kinds of controllable device, even if those different kinds of controllable device are not generally compatible with each other.

It may also be possible to key certain commands sent from an MCU 110 of an EM 100 to query specific values within an IM 50, or values within a controllable device 20 which has an IM 50 installed. For example, maybe the command "001" is a general query command, and accepts a one byte argument which could represent up to 256 different values that could be queried. This may make it possible to query up to 256 sensors, set points, or status levels present inside the controllable device. It may be possible that the argument is also keyed to certain characteristic values or status states.

Value 1 may be, for example, a status as to whether or not the light is fully recycled after a previous activation which may report a level of 255 if fully recycled, and if not fully cycled, may report a number between 0 and 254 representing a percentage of the current recycle.

Value 2 may be a request as to the estimated time in milliseconds before a recycle is complete.

Value 10 may be a battery level in a set of batteries controlling the device—such as the percentage of charge of a set of 4 AA batteries in a camera strobe unit.

Value 100 may be an internal ambient temperature sensor, value 105 may be a temperature sensor on the xenon tube, and value 115 may be the current rotational speed of a cooling fan reported in revolutions per minute.

Thus, for example, the EM 100 may request of the IM 50 the estimated time until fully recycled by sending the packet:
001, 002

The first byte may tell the IM 50 that the EM 100 is making a query, and the second byte may tell the IM 50 a recycle time estimate is requested. The IM 50 may then use its hardware specific components 55 to perform an analog to digital conversion of a voltage that may be currently stored in a power capacitor within the controllable device. And because the software of the MCU 54 of the IM 50 may be specifically written to the characteristics of the given controllable device, the MCU 54 of the IM 50 may know that the capacitor takes about 100 milliseconds to charge from its current voltage to its maximum voltage and thus may report back to the EM 100 a value of "100" in a single byte.

This value may be useful in that it may be sent back via the radio module 116 in the EM 100 to the wireless controller 75 coupled with the camera 1, or camera system 10. The camera system 10 may know to schedule its next shutter release in approximately 100 milliseconds. This may be useful in the event of high speed shooting where many shutter activations are required in short succession. If another value is queried such as the RPM speed of a cooling fan of a controllable device, that value may be sent back by radio signal from the EM 100 to the wireless controller 75, or communication facility, of a camera system 10. In some example embodiments the controller 75 may be considered a communication facility, and may be configured to display the returned value on a display 13, that may be included in on the wireless controller 75, where the camera operator may easily view the real-time status of the cooling fan.

It is thus clear that virtually any characteristic of a controllable device 20 may be queried, and virtually any signal to which the controllable device is responsive may be created using hardware 55 and software on an MCU 54 specific to that piece of controllable device 20 by an IM 50, and it may be possible to devise simple digital data signals which may be passed between the EM 100 and IM 50 which may correlate to those query and control signals.

The processing suite or MCU 110 of the EM 100 may receive communication signals from the radio receiver 116, or transceiver 116, and may also transmit signals to the radio transmitter 116 or transceiver 116. It may, therefore, be possible to further extend the logic of an example protocol to be bridged over the radio reception or transmit facility 116 of the EM 100.

It may then be an easy matter, according to various embodiments, to fit a camera or other device with a radio transmitter or transceiver unit 75. The radio transmitter unit 75 may then use the devised protocol to illicit desired results or query desired data from various controllable devices 20 fitted with an EM 100 and IM 50 in accordance with the current disclosure.

A given example IM 50 of the present invention may be designed for a specific make and model of controllable device 20. The IM 50 may be configured to have access to certain controls, sensors, or other useful facilities included with the controllable device 20. The MCU 110 of an EM 100 may be configured, via its communication link with the IM 20, to determine what some or all of these features are, for example, the expected min and max set points of certain parameters and the like.

The IM 50 may include equipment type identification number, hereafter "Equipment Type ID", or "EQID". The EQID may identify the make and model of a particular controllable device in which it is installed. For example, a given model of flash unit may be assigned an EQID of "123123". Every IM which is designed for use with this particular model of flash will report its EQID as "123123". The EQID may be sufficiently long to insure a large number of devices can be identified. For example, a 32-bit EQID may allow over 4.2 billion specific models of controllable device to exist worldwide, and may only require 4 bytes of memory space to store locally and in various reference profiles.

When an EM 100 is connected to the controllable device 20, a communication between the EM and the IM installed in the equipment may be initiated as discussed. The IM 50 may report its EQID to the EM 100. The EM 100 may then reference a list of profiles stored in its own memory to lookup the expected characteristics of this particular controllable device 20. The EM 100 may also report back by radio signals via a radio module 116 wirelessly to other portions of the lighting equipment the specific make and model of controllable device 20 which just became available to the overall lighting system.

The EM 100 may have a pre-programmed list of all the features expected to be available on every current IM 50 it may possibly encounter stored in its internal memory, or it may report the reported EQID back via radio signals to another device such as a personal computer or other master control device 75 which may be capable of looking up the EQID in its own stored list of profiles, or making a query via network or the internet to retrieve the specific profile from a remote database server. The parameters and specifications used to communicate with the specific IM 50 may then be returned to the EM 100 which may then store the parameters and may begin having a useful communication with the specific IM 50.

The EM 100 may also include a Hardware Identification Number (hereafter "Hardware ID", or "HID"), which may be unique to that specific EM 100 and not duplicated in any other EM 100. The EM 100 may be programmed to allow the use of certain licensed features available to the IM 50. Those licensed features may be keyed to the HID of the particular EM 100.

Various embodiments may enable controllable device 20 manufactures to introduce new features and functionality made possible with their devices and newly available upon paying a license to use them. The license-able features, or functions, may be made available for predetermined trial periods.

A simple lookup table may be included in the memory on the EM 100 which may store a list of all currently active EQID's, and a set of flags or binary bits for each EQID, each flag or bit representing a given useful or licensed function that the IM 50 may be able to enable the given controllable device to perform. A 64-bit flag space may be configured to allow 64 different features to be allowed or disallowed by a given IM 50 for a specific controllable device. A lookup table stored in a memory in an EM 100 may then require, using the above example, 12 bytes of space for each model of controllable device which it may come in contact with—that is 4 bytes for the EQID, and 8 bytes for the 64 individual bit flags representing licensed features.

Many current microprocessors include 2K bytes or more of EEPROM memory right on the microprocessor. This may make it possible for more than 160 profiles of controllable device to be recorded, and far more if the number of flag bits is reduced, or additional EEPROM is added.

The EM 100 may be capable of communicating directly with a personal computer or other device capable of communicating with a computer network such as the internet via a wired USB connection using a provided connector 102 on the EM 100, or wirelessly through some other protocol such as BlueTooth, WiFi, a pulsed light Infrared protocol such as IrDA and so on; such that the EM may be in communication with a remote database either directly or via some intermediate computer system, WiFi wireless access point, etc.

The EM 100 may include a unique HID. This HID may correspond to a record in a database on a licensing computer server located on a computer network. The record may be keyed to every currently manufactured EQID, and all of the 64 licensing bit flags which are keyed to each EQID.

For this disclosure, "license keys", "bit flags", "license bits", "key flags" and the like are used to describe the above discussed binary bits which may correspond to licenses to allow an EM 100 to authorize an IM 50 to carry out certain functions which correspond to the issuing of a license to carry out those functions.

In communication with a licensing server, it may be possible to enable certain license key flags which are referenced uniquely to a given EM 100 for a certain set of controlled equipment. Each model of controllable device may be referenced by the EQID of that controllable device, and each EQID may have a set of flags or license bits. Each set of license bits may represent an authorization or license to perform a given function by the IM specific to the given model of controllable device matching the given EQID.

The license flag bits found in the remote database corresponding to the given EM 100 having the given HID, and corresponding to a specific make and model of controllable device 20 by the EQID of that controllable device 20 may be synchronized with the lookup table stored in the EM 100. The flag bits may represent licenses for IM's 50 having the given EQID to perform specific functions, and those licenses may be in effect stored and carried by an end user on an EM 100.

If a user wishes to obtain use of a given feature of a given controllable device 20, which may have an installed an IM 50 therein, the user may pay for the license to use said feature and report the HID of the EM 100 that will carry the license. The flag for the newly purchased feature may be set for the desired EQID corresponding to the given HID of the given EM 100 in the remote database. The user may then allow the EM 100 to synchronize with the remote database as described above, and the new license flag for the newly purchased license may be set in the lookup table for the given EQID in the memory of the EM 100.

When the particular EM 100 is attached to a controllable device 20 containing an IM 50 with the EQID and hardware 55 giving capability of the newly purchased feature, the IM 50 may report its EQID to the EM 100. The EM 100 may look up that EQID in its stored reference table, and report back all the flag bits for the enabled features. In this case, a flag bit may be set for the purchased feature. The IM 50 may then execute commands to perform the specific functions for which the appropriate license flag bits have been set, and may not execute the commands for which the appropriate licensing flag bits have not been set.

It may be possible a malicious user may attempt to gain access to functions of the IM 50 which are licensed by the manufacturer by study of the electrical circuits of the IM 50. The user may further attempt to write a firmware capable of being executed by the MCU 54 which may activate the electrical circuits even if a valid license was not requested from an EM 100. The user may even attempt to circulate this firmware on the internet causing loss of control of the licensing system. Accordingly, various embodiments may provide various security measures to avoid such actions by potential malicious users. For example, embodiments may write various software keys or specific serial numbers onto the MCU 54 of a given IM 50 at the time of manufacture. The keys may only be known to an EM 100, and software developers.

When the EM 100 is first attached to the controllable device 20 and begins to communicate with the IM 50, the EM 100 may request these known serial numbers, which may have been written at specific known locations in the memory space of the MCU 54 of the IM 50. If the EM 100 does not receive the expected response, it may stop communicating with the IM 50 and may report an error to the user by radio signal or output directly on the EM 100. These pre set data and pre set locations may not be known to the creator of the unauthorized firmware and may be likely to be over-written when programming the unauthorized firmware, thus discouraging the practice of attempting to circumvent the licensing system.

Conversations between the EM 100 and the IM 50 may be encrypted during conversations exchanging license key flags between the EM 100 and the IM 50. Encrypted communication between the MCU 110 of the EM 100 and the MCU 54 of the IM 50 may be established prior to exchanging identification numbers or data representing the authorized feature sets or flag bits.

The encryption process may be carried out using, for example, standard shared key AES type encryption. The encryption and decryption process may be carried out by hardware peripherals built into either a microprocessor, or may be carried out using a few lines of computer code easily constructed by the software developer. The process of shared key encryption requires minimal additional latency or overhead by the MCU and may not cause significant delays to the throughput of the required data transmission. This in effect may make the conversation of the exchange of license keys useless to any person or system observing the conversation.

This disclosure describes the EM 100 of the present invention as being the primary device used to record license flag bits, and that EM 100 being the device which authorizes an IM 50 to perform given functions based upon the presence or lack of presence of given license flag bits, but it should be noted it is possible to implement the licensing facility in various other patterns.

For example, the IM 50 could alternately be used to record license flag bits, or flag bits which may be temporarily stored on an EM 100 and then passed to an IM 50 during a handshake or other communication between an EM 100 and an IM 50. It may be possible that an IM 50 may allow any function to which it has controls to operate regardless of flag bits. The EM 100 itself may determine which features it is allowed to directly cause to operate, and so on.

Embodiments may enable the system to record authorizations to perform licensed features in other ways, such as storing an entire byte instead of a single bit, or storing a complex system of bytes which may correspond to an actual license number rather than a single bit representing the authorization to use such a feature.

Embodiments may enable the system to record with the license flag, bit, byte, or bytes, a criteria relating to an allowed time of use, required renewal, number of authorized uses, and so on. For example, a license flag may be set to allow a feature, but the feature may have a period of time preset, such as 30 calendar days before that license flag will no longer be valid; or using a real time calendar facility in the IM 50 or EM 100, a given feature may be valid until a specific calendar date and time. In another case, a license flag may be stored with, or separately related to, a count of the number of times a feature may be activated. For example, a particularly useful polling of controllable device 20 may be authorized as something of a "free trial" on newly purchased devices, the user being able to poll the remote devices, for example, twenty times before the flag is no longer valid and a license must be purchased or renewed to continue using the feature. It is also possible to authorize features purely on a "pay per use" basis, whereby the number of uses may be recorded, and an owed amount of money for the use of such features may be calculated by a computer system during a synchronization process between a device of the present disclosure and a computer system.

The Internal Module IM 50 may be configured to send or receive signals to or from components internal to a controllable device 20. The controllable device 20 may be any of many possible devices including but not limited to still photographic cameras, video cameras, motion film cameras, camera flash units, studio strobe units, power flash packs, constant lighting unit "hot light", LED array units, or any other equipment used to create light to assist in the illumination of a scene for still or motion photography; any other equipment used to record light from a scene such as any kind of camera or light meter; any kind of lighting or camera positioning equipment such as systems driving cameras on tracks, height positioning, yaw, tilt, and zoom controllers; any kind of auxiliary equipment used in the field of audio, video, or photography including but not limited to microphones, audio monitor speakers, head phones, sound mixing boards, electronic music instruments, audio and video filtering hardware; stage effects, visual effects, pyrotechnics processing and control systems, etc.

Referring now, in particular, to FIGS. 2 and 17, the IM 50 may include a printed circuit board "PCB" 61 which may include the microprocessor 54 capable of exchanging digital data communications via electrical signal lines 52 or optical signaling means with an EM 100. The IM 50 may also contain various electrical components 55 which may be configured to interface using various signals with other circuitry or controls internal to the controllable device 20.

As mentioned, the IM 50 may include a power or voltage regulator 53 which may draw power from a connection 60 to a voltage power source internal to the controllable device 20, and any required voltage supply filtering components such as resistors, capacitors, and inductors or ferrite chokes to eliminate electrical noise which may be produced by the controllable device 20. The voltage regulator 53 may be connected on the source side to some power source 60 that may be present internal to the controllable device 20. The supply side may be connected to provide normal operating power for the IM 50 and its components. The supply side may also pass power through the external connector 40 to power the EM 100 when attached to the controllable device 20.

EMI shielding may be provided to the components of the IM 50 or to the entire module, or the connecting wires, or all of the above, as components such as stroboscopic flash elements and xenon tubes, and the like, may produce substantial bursts of electromagnetic energy when discharged or during the recycling of power capacitors. The energy produced may be damaging to the IM 50. The EMI shielding may be may be coupled with the EM 100 via the electrical connector between the IM 50 and EM 100. In some cases, it may be desirable to place an opto-isolator in series with the signal lines 52 prior to connecting to the external connector 40 to prevent spikes or noise from being coupled into an EM 100.

The PCB 61 of the IM 50 may be constructed as small as possible, and may be formed and shaped to specifically fit into a given open space internal to the controllable device. The location may be as near as practical to the placement of the external connector 40 and the points at which the IM 50 will electrically connect to the circuitry present in the controllable device 20. IN some cases, the PCB 61 may be split into several parts, for example, multiple PCB's, each containing a portion of the desired circuitry, and/or the various parts electrically connected. It may be particularly helpful in confined spaces to locate various portions of the IM 50 in more than one place inside the controllable device 20. Doing so may facilitate getting all of the desired components to fit inside the controllable device 20.

The entire IM 50 or portions of the IM 50 may be wrapped in an electrically nonconductive material such as industrial heat shrink wrap. This may help to protect and isolate the IM 50 from shorting against components internal to the controllable device 20. An adhesive may be provided on the exterior of the heat shrink to stick the IM 50 to an internal surface of the controllable device. The IM may also be designed with screw bosses or other fasteners, provide latches for zip ties, and so on—making for easy securing of the IM 50 inside the controllable device 20.

The I/O circuitry 55 of the IM 50 may include various components available to a circuit designer for interfacing with the characteristic signals found inside the controllable device 20. Some examples are provided as follows:

In one example, a single trigger or activation signal may be the only signaling to the controllable device provided by the IM 50. Many photographic strobe units may provide a voltage to a sync jack connector 26 or hot shoe already installed during manufacturing. Normally, a camera system may pull this voltage low or mechanically shorts it to ground when the camera shutter is open, and the falling voltage may cause the equipment to activate.

IN some embodiments this voltage may be pulled low from the IM 50 by providing a simple NPN transistor. The collector of the transistor may be electrically connected to the trigger voltage internal to the controllable device 20. The emitter may be tied to ground, and the base may be powered via a series resistor directly from the MCU 54 or via other components. When the base of the transistor is energized, the transistor may open and pull the trigger voltage to ground, causing the controllable device 20 to activate. This trigger line may be soldered to one of many points inside the controllable device 20, perhaps the most convenient being at the inner side of the sync jack already present in almost all strobe lighting devices. The transistor may be rated to handle the voltage present on the trigger line. In modern devices this may be only about 5 volts, but in older lighting equipment it may be several hundred volts.

Raw analog voltages and sine waves may be generated by Digital to Analog Conversion "DAC" components. The MCU 54 of the IM may have DAC peripherals built right in, or a DAC integrated circuit may be used and controlled by the MCU 54. Conversely, analog voltages may be sampled by an Analog to Digital Conversion "ADC" arranged in a similar way. The DAC and ADC may be used to set or sample reference voltages and power levels. It may also be used to sample or reproduce audio or video signals. For example an IM 50 installed in a microphone may be used to sample the audio input to that microphone and cause that input to be sent wirelessly by radio via an attached EM 100. It may also be possible to reproduce audio or video to monitor speakers or video displays in a similar way.

Digital signals may be provided directly from the MCU 54 in direct electrical connection to circuitry internal to the controllable device, or may be routed through isolation components such as opto-isolators, allowing high and low signals (for example serial data) to be passed to the controllable device without directly electrically connecting to it Filtering and over voltage protection should be taken into account where any electrical conductor of the IM 50 is connected to an electrical portion of the controllable device 20. In most cases, the controllable device may have components that operate at a voltage which might damage the components on the IM 50. A diode rated for a reverse voltage as high as, or higher than, the maximum voltage found within the controllable device 20 may be provided in series with all control or signal lines which may electrically contact components internal to the controllable device 20.

Figure 19:
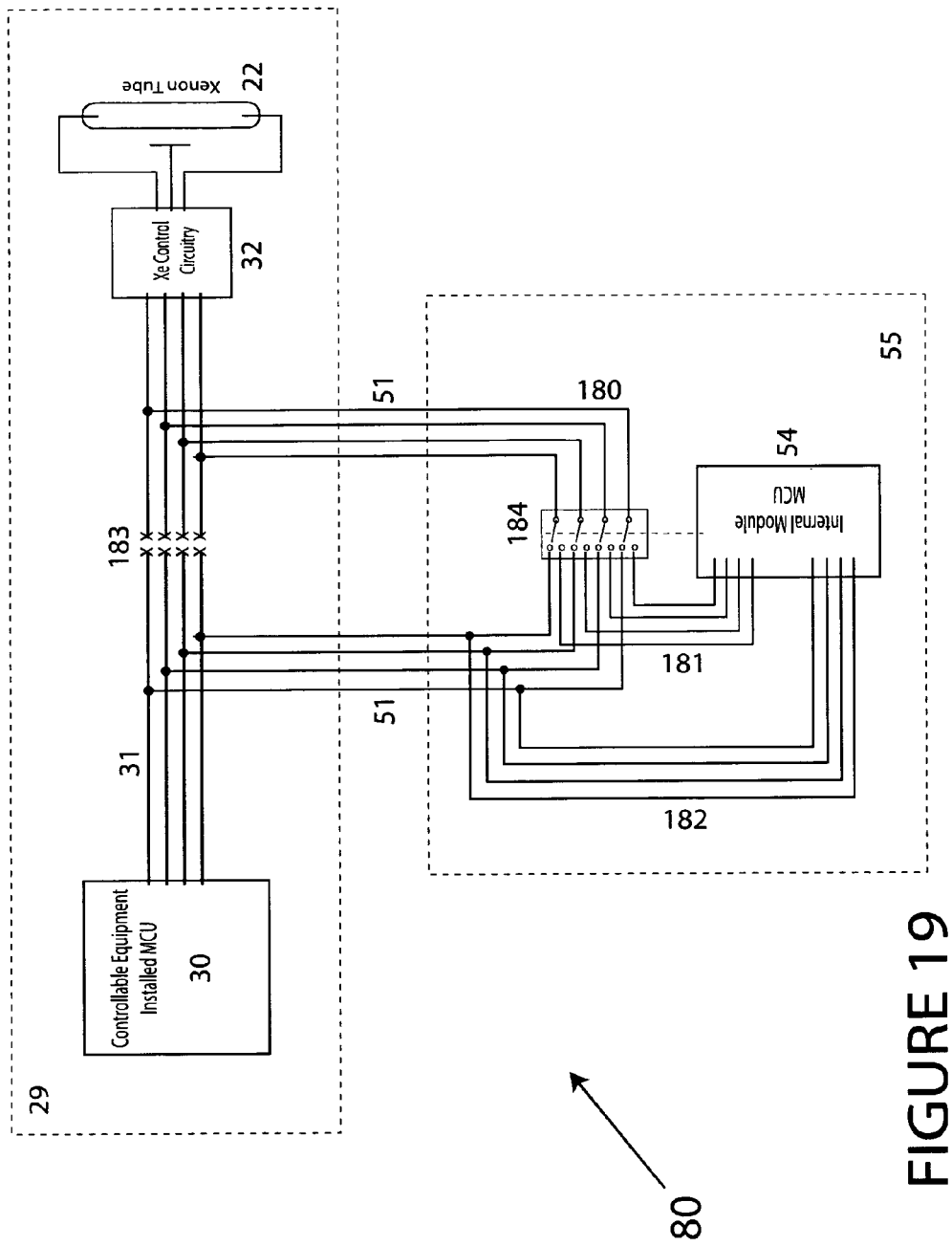
FIG. 19 is a schematic view illustrating an example circuitry configuration wherein circuitry from the IM may be coupled with circuitry of a controllable device.

FIG. 19 is a schematic view illustrating an example circuitry configuration 80 wherein circuitry 55 from the IM 50 may be coupled with circuitry 29 of a controllable device 20. The circuitry configuration 80 may make it possible to perform more advanced control functions by temporarily taking control of signal lines present in the controllable device. This may involve, for example, taking control of SPI, I2C, RS-232, USB, or other digital communication lines internal to the controllable device 20.

For example, a controllable device 20 may be manufactured which may include device circuitry, that may include an input portion including a control unit, such as a microprocessor 30, which may send signals 31 to an output portion, which may include a charge, discharge, and control a circuit 32 which controls the emission of light from a xenon tube 22. Then, a set of one or more control lines 182 to the conductors 31 coming from the microprocessor 30 already present in the controllable device 20 may be contacted. Control lines 183, or circuit board traces, leading to the xenon tube control circuit 32 may then be cut, and a second set of control lines 180 to the conductors leading to the xenon tube control circuit 32 may be connected. This arrangement may make it possible to route both sets of control lines 51 to the MCU 54 or other specific circuitry 55 of the IM 50.

The IM 50 may include a switching device, or switch 184, by which the lines 182 coming from the microprocessor 30 of the controllable device may be normally electrically connected to the control lines 180 leading back to the xenon tube control circuit 32 just as they were before the installation of the IM 50. The MCU 54 of the IM 50 may momentarily switch the lines away from the microprocessor 30 of the controllable device 20 and electrically connect these control lines to a corresponding set of control lines 181 connected to itself and take direct control of these lines itself—sending its own signals to the xenon tube control circuit 32. After a short period of controlling the control circuit 32 and xenon tube 22 from the MCU 54 of the IM 50, the switch 184 may be returned to its normal configuration and the microprocessor 30 present on the controllable device may again resume normal control of the control circuit 32 and xenon tube 22 as the electrical connections may be restored as originally designed into the controllable device 20.

In some cases, the xenon tube control circuit 32 (or any other circuit that produces a desired useful behavior of the controllable device 20), may provide a periodic or continual status or control signal back to the microprocessor 30 of the controllable device 20, and if the communication is lost with the xenon tube control circuit 32 during the time the MCU 54 of the IM 50 takes control, the controllable device 20 may enter an error condition which may be unpredictable to recover from. In this case, the MCU 54 of the IM 50 may be configured, via an appropriate circuit present on the IM 50, for example, to provide the expected status signal back to the microprocessor 30 of the controllable device that the xenon tube control circuit 32 would have normally provided, or a signal substantially similar to that control signal, or a default control signal which may cause the microprocessor 30 of the controllable device or other portions of the circuitry 29 of the controllable device 20 to remain unaware that it momentarily lost connection with a certain portion of its components, functions, or circuitry 32.

The example circuitry configuration 80 depicted in FIG. 19 is a simplified schematic. When switch 184 is thrown to provide access to the control circuit 32 from the MCU 54 via signal lines 181, it may be possible to also send the required expected feedback or status signal from the MCU 54 to the microprocessor 30 via signal lines 182.

This feedback signal may be a coded digital pattern, the content, protocol, or meaning of which may or may not be apparent. Alternatively, the feedback signal may be a specific analog voltage or voltage wave; or a set of pulses having a given duration, period, and frequency. In the case that the status signal sent from the control circuit 32 back to the microprocessor 30 of the controllable device isn't always known or predictable, the MCU 54 of the IM 50 may first observe the signal or status pattern being sent between the existing components 32 and 30 via signal lines 182 without effecting or interfering with the signal. The MCU 54 of the IM 50 may also store that control signal in memory. Then when taking control of the xenon tube control circuit 32 by throwing the switching means 184. The MCU 54 of the IM 50 may repeat this stored status pattern back to the microprocessor 30 of the controllable device via signal lines 182 with the required characteristics such that the microprocessor 30 of the controllable device is never aware of the momentary loss of communication with a portion of its components 32.

Thus, regardless of the complexity of signaling happening inside the controllable device 20, it may be possible to momentarily intercept this signaling, creating a fabricated or "cloned" control signal back to a controlling means 30 present inside the controllable device 20. And at the same time, it may be possible to take control of a portion of circuitry 32 within the controllable device to illicit a desired and useful response from the controllable device, then immediately return the functionality back to the normal microprocessor 30 or circuitry already present in the controllable device 20 such that normal operation of the controllable device is not noticeably interrupted.

It should be noted that the discussed example of intercepting a signal as discussed between a microprocessor and a xenon tube control circuit may be adopted to intercept any useful signal from any useful component or circuitry within any controllable device and to create a signal to which another portion of the controllable device is responsive to create a useful response.

The MCU 54 of the IM 50 may also be configured to report back to a microprocessor 30 or other signal management, processing, or memory storage circuitry of the controllable device 20 a new setting, status, or set point of a portion of circuitry 32 after interfacing with it, if the interfacing has changed the setting, status, or set point of the circuitry 32 and it is required or useful for the microprocessor 30 or memory storage circuitry to be aware of the new setting, status, or set point which was set or adjusted by the interfacing between the MCU 54 and the circuitry 32.

For example, assume an audio sound mixer has motor controlled sliders which set the mixing gain of an audio input channel. The IM 50 could using the above process, and take control of a given slider and cause it to move to a new position. The microprocessor already present in the audio mixer may have stored a variable representing the current position of each of the mechanical sliders on the sound mixer. If the IM 50 takes direct control and repositions the slider without the existing microprocessor being aware, a mismatch might occur possibly leading to operational errors or conflicts in the audio mixer. In this case, the MCU 54 of the IM 50 may take control of the slider, reposition it, then create a signal back to the MCU 54 that is normally created by the motor drive which positions the slider indicating the new updated position of the mechanical slider, such that no mismatch occurs.

The installed IM 50 should allow the controllable device 20 to retain all of its original functionality using the controls and user interface 23 implemented by the manufacturer. When the IM 50 causes the controllable device to operate, the operation should create minimal disruption to the user or normal user interface, and should mimic and create the same response on the user interface the user is accustomed to when the controllable device operates without the interaction of the IM 50. When properly installed and the controllable device is re-assembled after installation, the only evidence as to the presence of the IM 50 may be the existence of a connector, port, plug, 40 or optical signaling window installed in the exterior of the controllable device in a conveniently accessed location. The location selected may not interfere with the normal physical movement or operation of the controllable device 20 or its normal user interface 23, setting controls 24 or indicators 25 when a mating EM 100 is attached.

The IM 50 may also connect to various sensing, feedback, or status signals present inside the controllable device 20 via the appropriate circuitry 55 implemented to interface with the desired sensing, feedback, or status signals. It is also possible that additional low costs sensors may be installed along with the IM 50 in certain key locations inside the controllable device to provide the controllable device, via the additional status reporting, ability provided by the IM 50. For example, small thermocouples may be installed in portions of the equipment prone to overheating such as on or near a xenon tube 22. Sensors recording the revolutions per minute of a shaft may be installed near cooling fans and may report back the RPM of the fan, or airflow through the fan. Additional voltage monitoring points may be installed to monitor for example the remaining charge of a set of batteries, or to measure the amount of time required to recycle the xenon power capacitor from a given voltage to another given voltage—that time being an indication of how well the batteries are performing. These various feedback and sensing means may be easily reported to other portions of the lighting system as discussed previously in this disclosure.

It may also be possible to connect to substantially every user output or display function 25 of the controllable device 20 and substantially every user input function 24 of the controllable device 20. Thus it may be possible to completely remotely recreate the exact user interface and button operation of the controllable device such that a user does not have to re-learn a control system. They may, for example, use a remote version of the same control system as that provided locally to the controllable device. All or portions of a display such as a liquid crystal display output may be monitored internal to the controllable device, and the content of that display may be sent wirelessly using the present invention as previously described. Also, inputs to a touchscreen sensor applied to a display of the controllable device may be cloned for a desired response of the controllable device as previously described.

All displays, status lights and other user outputs or indicators installed on a given piece of controllable device 20 may be recreated remotely and wirelessly by another remote physical display such as the display 13 provided on a wireless control device 75 used with a camera system 1, or recreated graphically on a computer screen, on the interface of a personal digital assistant, or on a device such as an Apple iPhone.

This integration of control functions may be accomplished in various ways. One example may be to electrically via lines 51 connect from the circuitry 29 inside the controllable device 20 with the signal line to every segment of an LCD display; a power line to every indicator light; and the trigger contact to every switch or button, to the IM 50. The IM 50 may then be able to initiate a response in the controllable device 20 by electrically pressing any button for example, if a button press pulls a line to ground. Then the MCU of the IM could cause a similar response whereby the given signal line may be pulled to ground, thereby causing the exact response in the controllable device that may have been created had the actual physical button on the controllable device been pressed. Another example process might be to monitor the digital signal lines going from a microprocessor 30 of the controllable device to an integrated circuit which drives a liquid crystal or other display. If the signaling protocol is known, and by observing the control signals to the display driver, it may be accurately predicted how the actual display will react, it is possible to monitor a display or other output means with far fewer sensing lines 51 than connecting to every segment of a display.

Figure 20:
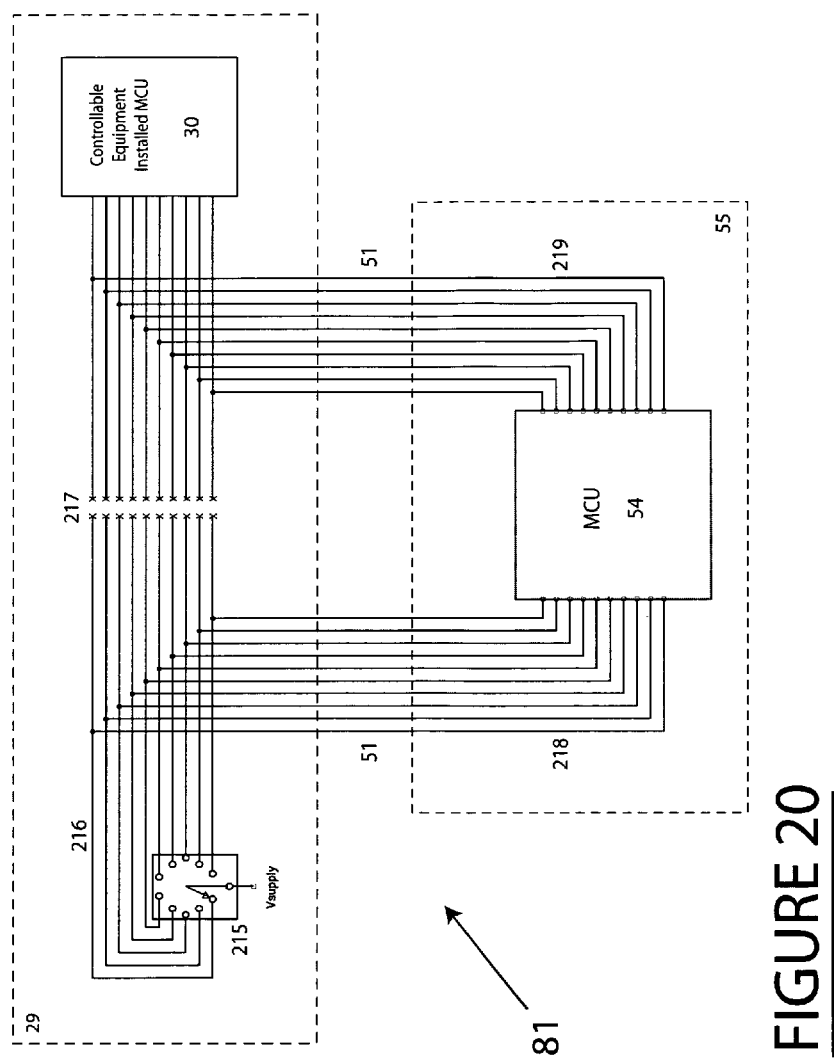
FIG. 20 is a schematic view illustrating another example circuitry configuration wherein circuitry from the IM may be coupled with circuitry of a controllable device.

FIG. 20 is a schematic view illustrating another example circuitry configuration 81 wherein circuitry 55 from the IM 50 may be coupled with circuitry 29 of a controllable device 20. This example illustrates using variations of the above approach, to observe, simulate, or control the position of manual variable settings and controls—such as the position of a physical rotary selector switch, slider, or other control.

As depicted by FIG. 20, a given controllable device 20 may have a rotary switch 215 used to select various modes of operation of the controllable device 20. In most cases, it may not be possible to remotely physically reposition the rotary switch as the rotary switch likely does not contain a motor drive ability. (It should be apparent from the disclosure, however, that it would be possible to illicit a response of that motor drive by the IM 50 to physically reposition the switch.) In accordance with various embodiments, it may be possible to observe the current set point of the physical switch 215 by an electrical connection to the processor 54 of the IM 50 via lines 216, 51, and 218. It may then be possible for the processor 54 of the IM 50 to intercept this current set point by creating an artificial output 219 which is representative of the rotary switch in various positions to the microprocessor 30 of the controllable device from signal output 219 to the microprocessor 30 via lines 51. The microprocessor 30 may no longer able to directly sense the position of switch 215 as the direct connect signal lines are cut 217. If the IM 50 is commanded by an EM 100 to effectively place the rotary switch 215 in a new position, the IM 50 may create the output 219 to the controllable device that would normally have been created had the selector actually been physically rotated to a new setting. At the same time, the IM 50 may continue to observe, via line 218, the actual physical position of the physical rotary switch 215 by monitoring the switch output signal. If that output signal is changed (for example, if a user attempts to take local control of the device by actually turning the physical selector switch), the IM 50 will observe that the switch has been repositioned via a software interrupt routine triggered when the switch was moved. It can then release manual control of the signal and allow the signal being produced from the actual physical switch 215 to be observable by the normal circuitry or microprocessor 30 present in the controllable device 20. The IM 50 may also optionally retain control of the signal, or, the IM 50 may be commanded by an EM 100 at some point to release the cloned position of the selector 215, and allow the internal circuitry of the controllable device 20 to again directly observe the actual position of the physical selector 215.

It may also be possible for the IM 50 to switch off or power down certain portions of controllable device based on any criteria. For example, after reading an internal thermocouple the IM 50 may power down a cooling fan when a temperature is below a set point. The IM 50 may be able to cause the fan to resume operation if the temperature exceeds a predetermined set point. Similarly, it may be desired to turn off a modeling lamp if no user interaction has been observed for a specified period of time. This may accomplished by splicing into the electrical supply to power the cooling fan, modeling lamp, or other components and routing that power through a switch, relay, or transistor provided by the IM 50 and controlled by the MCU 54 of the IM 50.

Figure 21:
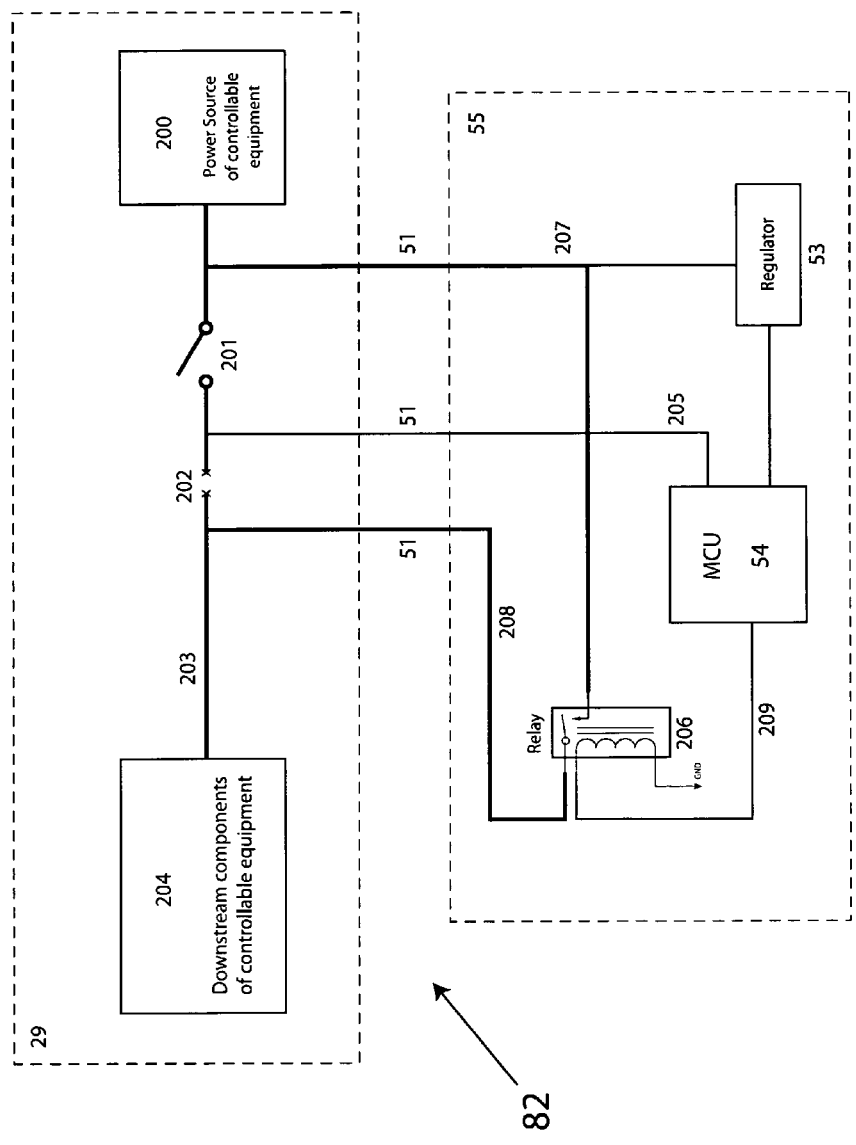
FIG. 21 is a schematic view illustrating another example circuitry configuration wherein circuitry from the IM may be coupled with circuitry of a controllable device.
Figure 22:
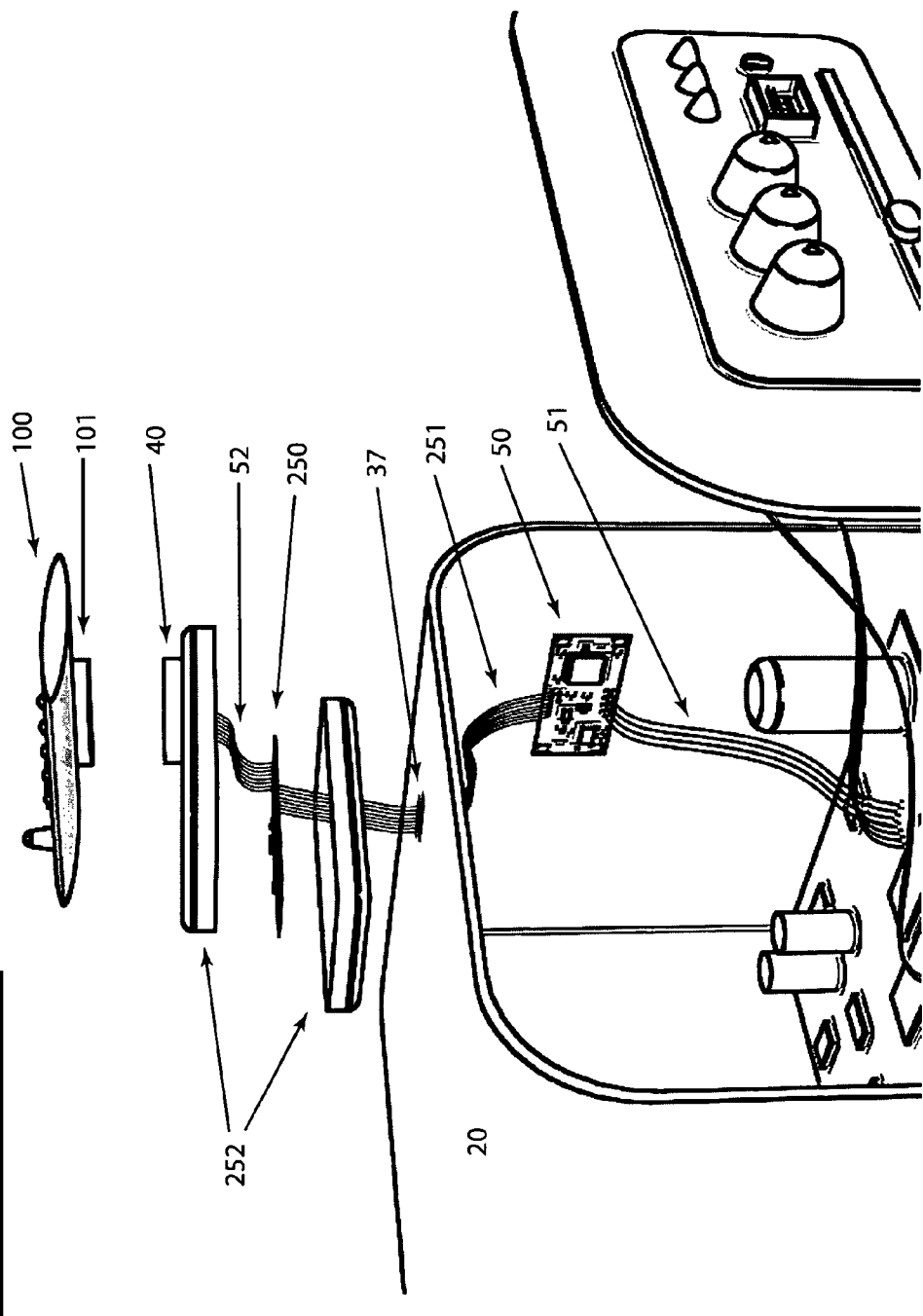
FIG. 22 is an exploded perspective view of an example installation of an Auxiliary Module in accordance with the current disclosure.
Figure 23:
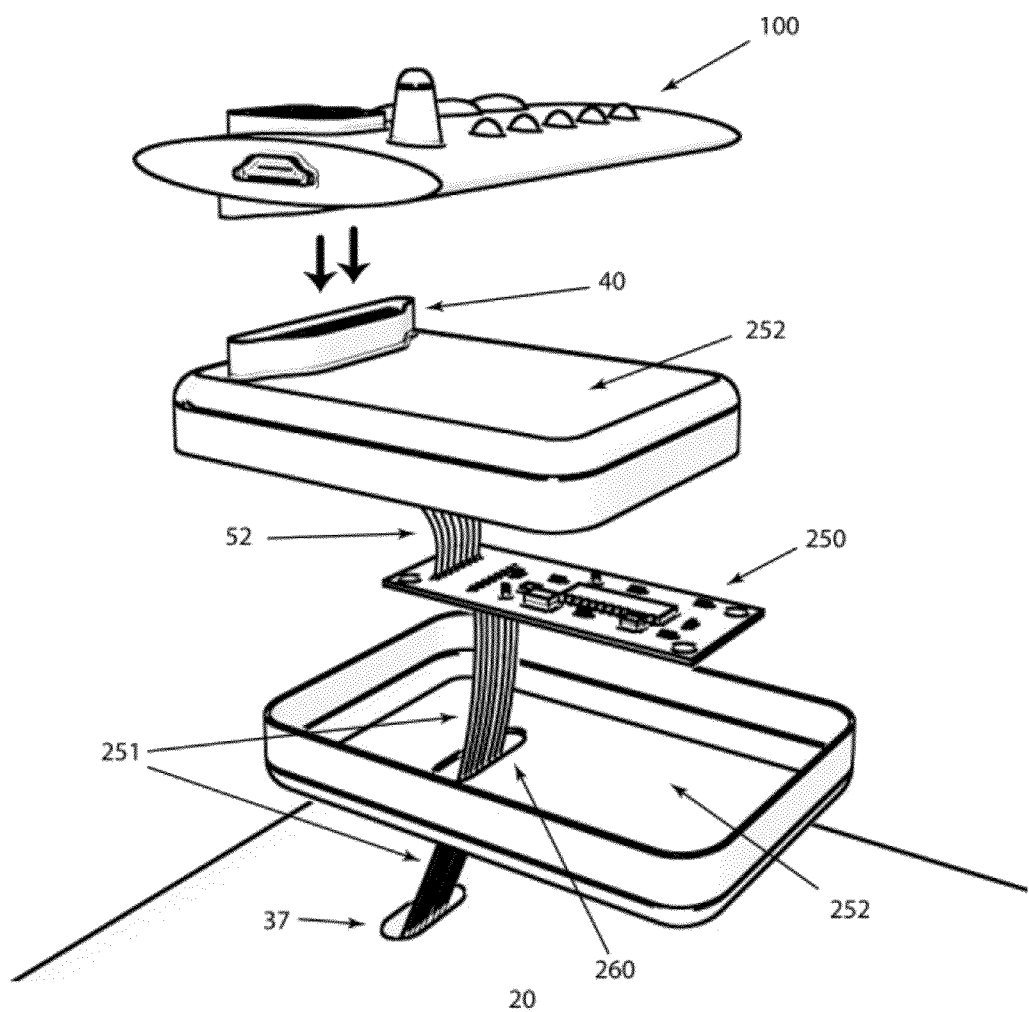
FIG. 23 is an exploded perspective view of the installation illustrated in FIG. 22 shown from a different direction.
Figure 24:
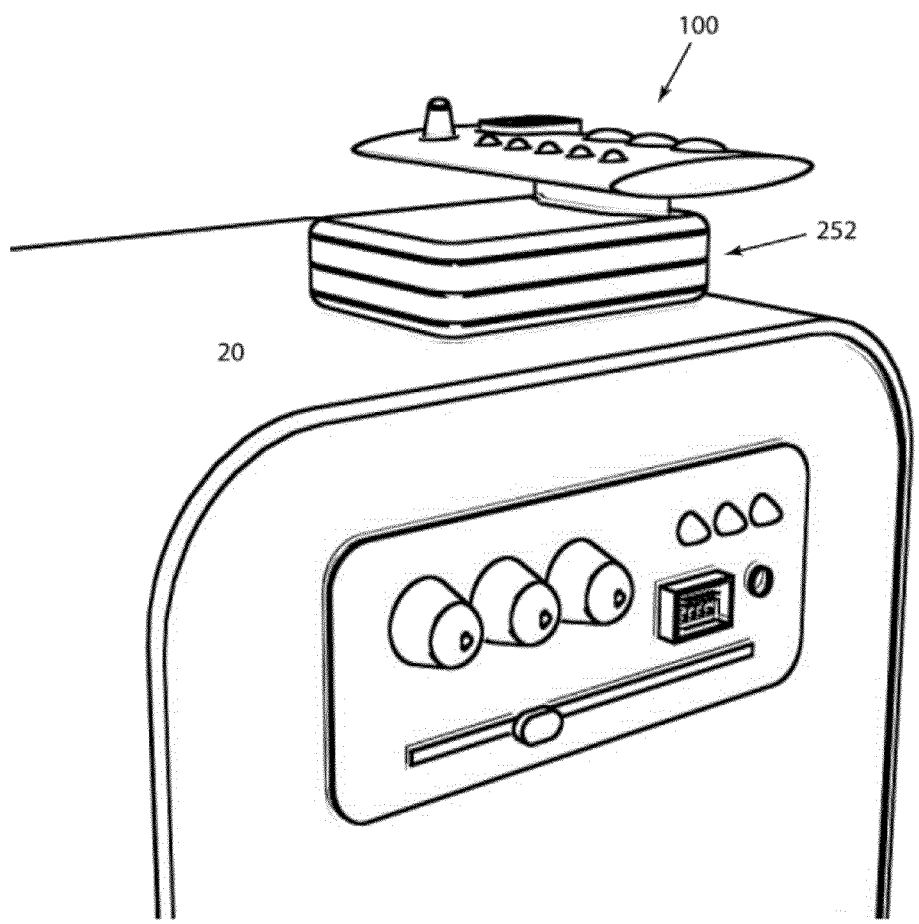
FIG. 24 is an exploded perspective view of the installation illustrated in FIG. 22 shown from a different direction.

FIG. 21 is a schematic view illustrating another example circuitry configuration 82 wherein circuitry 55 from the IM 50 may be coupled with circuitry 29 of a controllable device 20. This example illustrates controlling the main power switch or power function of the controllable device 20, 29 by the IM 50, 55, and 54. This may be accomplished by splicing or cutting line, or trace, 202 into the signal output 203 of the main power switch or button 201 between the switch and the point at which the switch connects to downstream components 204 or processing with a second switching means or relay 206 which may be operated 209 by the MCU 54 of the IM 50. It may also be possible to contact the signal or power supply 200 to the main power switch 201, and via the second switching means 206, to route power or signals 207, 208 around the physical installed switch 201, controlled by the MCU 54 of the IM 50.

In many cases a voltage capable of being used as a power supply for both the IM 50 and an EM 100 may be accessible internal to the controllable device even when the main power switch is turned off. One side of the switch 201 may have a voltage in order for it to function as a switch. Embodiments may therefore route operating power to a power regulator 53 of the IM 50 from signal line 207—the input to the relay used to route incoming power. The regulator 53 may be able to supply power to the IM circuitry including MCU 54 and an EM 100. The MCU 54 may also sense the output of the physical power switch 205, now cut at 202 from supplying the circuit 203, 204, and use the position of the physical switch 201 via 205 as an input to the MCU 54 to choose whether to open or close the electronic switching means 206. Thus the controllable device 20 may still operate by the activation of the installed physical switch 201, but the position of this switch may be overridden in either direction by the IM 50 at any time. Thus various embodiments make it possible to place controllable device in locations not easily physically accessed—such as in an overhead space. With the controllable device 20 having an IM 50 and an attached EM 100, it may be possible to completely power the controllable device 20 on or off wirelessly via radio signals.

Returning to FIGS. 2 and 17, an Internal Module 50 may include a PCB 61 to which the other components of the IM 50 may be attached. The IM 50 may include a microprocessor or "MCU" 54. The MCU 54 may incorporate a software program or "firmware" directing the operation of the MCU 54. The IM 50 may also include a clocking oscillator 56. Internal Module 50 may include at least one connecting point or solder pad whereby at least one signal, via line(s) 51, may be sent to a circuit 29 internal to the controllable device 20. The signal may cause the controllable device 20 to illicit an action or useful behavior; or whereby at least one signal 51 may be received from a circuit 29 internal to the controllable device. The signal may represent some useful value, indication, process, activity, characteristic, or status of the controllable device. The signal may represent a source of operating power 60 via a voltage regulator 53, and may be sourced by a voltage internal to the controllable device. Note that many of the figures of this disclosure depict only 4 conductor lines, though it should be understood that the actual number of conductors may vary between various pieces of controllable device—only a few lines for simple embodiments, but an embodiment giving control to elaborate and sophisticated interfaces—such as installation in the audio mixer of a large recording studio, may require several hundred or more lines, all for the simplicity of this disclosure, depicted as a set of signal lines, power supply lines, ground lines, or any combination thereof as 51.

Internal Module 50 may include at least one digital signal reception and transmission device such as a SPI port or I2C port; and a second set of solder pads or connections 52 that connect to the digital signaling means and the power regulator 53; a set of wires leading to a connector or port 40, or having connector 40 installed directly on the PCB 61 without requiring wires; the connector 40 installed by cutting an appropriate opening in the external enclosure of the controllable device, and allowing connection by an EM 100 to the power source 53 and digital signaling means of the IM 50. The entire package (obviously except for the connector) may be wrapped in an electrical insulating material such as plastic shrink wrap.

The MCU 54 of the IM 50 may be any signal processing device. Embodiments may have a small footprint and may be relatively inexpensive, for example the ATXMega family and ATTiny family of microprocessors manufactured by Atmel, ideally including only enough pins to control the functions or circuitry 55 specifically needed for the controls expected of the given IM 50. These devices may have an internal clock oscillator so no external oscillator may be required. Some MCU 54 models may require an external crystal 56 or resonator to provide a clock source. These MCU's may be reprogrammed while installed in an application circuit using one of their general or specific data ports, such as programming via a SPI port, or a dedicated programming and debugging interface.

The IM 50 may be designed such that it may be possible to access a set of signal lines 52 capable of causing the device to reprogram itself via characteristic contacts of the external connector, or to design a protocol such that the digital signaling may also convey data intended to reprogram the MCU 54 of the IM 50. It is then possible to reprogram a firmware on an installed IM 50 via connection to a dedicated programmer plugged into the external port 40, or the new software firmware may be communicated by the EM 100, and the EM 100 may have retrieved an updated firmware for the IM 50 from a network server when connected to a computer network device for the synchronization of its license keys. Causing the firmware update from the EM 100 is also desirable as the MCU 54 of the IM 50 may already know it is communicating with a licensed EM 100 before allowing itself to accept an incoming firmware. It is important that it is made difficult to reprogram the MCU 54 of the IM 50 by any but an authorized source. A malicious user could devise a firmware that causes activation of licensed functions within the IM 50 without first checking to see if a valid key is present to allow the operation thus it is important to disallow easy access to the writing of firmware from readily available sources.

The IM 50 may include a nonvolatile memory capable of storing settings. Common EEPROM or FLASH type memory may be used, including other less common memory storage solutions. This EEPROM may be designed internal to MCU 54.

The IM 50 may include a power regulator 53 which may be able to regulate power drawn from a power source contacted internal to the controllable device 20. This power regulator may supply at the least, a 3.0 volt DC output or other voltage as required by circuitry of the IM 50 and EM 100. The regulator may also instead of or in addition to, supply 5 volt DC or other voltage if needed. The regulator may also be required to supply voltage characteristic of a specific voltage used by signals inside the controllable device such that the IM is required to interface with. For example, if a control circuit inside the controllable device requires a 300 volt trigger signal, the regulator provided on the IM 50 should make possible the regulation of a 300 volt supply found within the controllable device 20 in addition to the 5 volt or 3 volt supply which may be required by MCU 54 and other components of the IM 50.

Care must be taken to keep incompatible voltages separate by using various isolators, transformers, diodes, voltage converters, and other components as would be understood by one skilled in the art of electric circuit design. This is to avoid possibly sending a high voltage such as 300 volts to the input of a microprocessor which may be rated only to 5 volts.

The regulator 53 must also supply low voltage power to the connector 40 external to the controllable device, and must be able to source approximately 50 to 100 milliamps, at a voltage between 2.8 volts and 3.6 volts. This supply will be used to power an attached EM 100.

The IM may also provide an output to an indicator light or display directly from the PCB of the IM, or via flexible wires. The display may be left internal to the controlled equipment, or may penetrate the exterior enclosure of the controllable device 20 near the external connector, placed near other instrumentation or controls of the controlled equipment originally installed by the manufacturer of the controllable device, or in another convenient location. The indicator light may provide feedback and indication to the user as to the presence of the IM 50, the power status of the IM 50, when the IM 50 successfully handshakes with an attached EM 100, or when it is desirable to communicate any other useful status information to a user or a technician servicing the equipment.

The IM 50 may include hardware identification devices similar to those described for use in an EM 100 of the present invention. Suitable devices include 57 the AT88SA102S from Atmel, and/or 58 the AT88SA10HS also from Atmel, among others. The IM 50 may include one or more "instant action" signal lines which may be used to mark the timing of very fast events, a specific rising or falling edge of a signal, etc—which would be difficult to mark using just serial communications to the MCU 54 as the serial communication and byte reception take some time which may be unknown or variable. An "instant action" line can drive for example a transistor 59 which may cause the immediate activation of an event within a controllable device.

An External Module 100 may include a microprocessor, or "MCU" 110, and a radio signal receiver, which may also include a radio signal transmitter, or a radio signal transceiver 116 capable of both sending and receiving radio signals. The EM 100 may include a nonvolatile memory that may be configured to be tamper resistant. The memory may store a unique serial number such as an HID that may also be difficult to tamper with. The EM 100 may also include at least one electrical connector 101 or cord mate-able with a similar electrical connector.

The EM 100 may include some user interface controls 104 such as power and configuration buttons, and a feedback mechanism such as lighted indicators or various displays. The EM 100 may draw primary operating power via line 121 from the electrical connector 101. The power may be provided via an IM 50 installed inside a controllable device 20. The EM 100 may also have an on-board, or secondary, power source such as a battery or a charged capacitor.

The EM 100 may also provide a means of data communication directly with a distributed network, or a computer system which in turn may be connected to a distributed network, either by a wired or wireless means. The EM 100 may connect to a personal computer using a USB connector 102 which may be electrically connected to a USB controller 119 or chipset installed within the EM 100. The EM 100 may draw operating power 122 from the personal computer via the power supplied by the USB connector during synchronization. Alternately, the EM 100 may be designed to include a WiFi, Cellular or other wireless networking scheme directly, in which case the EM 100 may participate as a device on a distributed network directly.

The EM 100 may be used in various configurations. For example, in a first configuration the EM 100 may be electrically connected to a controllable device 20 containing an IM 50. The EM may draw power from the controllable device 20. The MCU 110 of the EM 100 may send an interrupt signal to the MCU 54 of the IM 50 (or vice versa) via the external connector 101. The interrupt signal may indicate the presence of the EM 100 to the IM 50. The IM 50 and EM 100 may be configured to communicate using various communication methods including various encrypted communication methods. For example, they may be configured to use shared public key type encryption. This method may provide low processor overhead, and may be easily implemented. Using this method, the IM 50 may send a public key to the EM 100, and the EM 100 may send a public key to the IM 50. Both devices may use the public key along with the respective private keys held by each device to initiate an encrypted communication between the MCU 110, of the EM 100 and the MCU 54, of the IM 50. This encrypted communication may be used to exchange an EQID, and a set of flag bits representative of functions the IM is allowed to perform.

Using the established encrypted communication means, the IM 50 may then send its EQID to the EM 100. The MCU of the EM may look up the EQID in a reference table stored in its nonvolatile memory, and denotes the flag bits set for that EQID listing which are representative of licenses or keys to enable the IM 50 to carry out specific functions at the request of this particular EM 100. The EM 100 may send the flag bits back to the IM 50. The IM 50 may store the flag bits and enables or disables portions of the circuitry on the IM, or enables or disables the execution of certain portions of software within the MCU based on the flag bits. Once this "handshake" has been performed, the IM 50 may periodically poll the EM 100 to insure the module is still present and when an EM 100 may no longer be present, the IM may clear all of the flag bits for all of its licensed functions and awaits another EM to be inserted at which time the handshake happens again.

After the handshake, the EM may begin listening for radio signals matching characteristic patterns on a desired frequency and using a desired protocol. Protocols may include digital spread spectrum, direct frequency, frequency hopping, on-off-key modulation keying, frequency shift modulation keying, mesh networking standards such as ZigBee, standard computing wireless protocols such as WiFi, BlueTooth, and others.

When a radio signal data packet 12, 15, is demodulated by the radio receiver 116, the payload data is removed from the packet and sent to the MCU 110 of the EM 100. The demodulation and handling of the packet structure may be performed by a first-in-first out "FIFO" type facility within the radio receiver 116, such as that implemented within the commercially available Texas Instruments CC1101 radio transceiver, or the raw "transparent" or synchronous demodulated data may be output via a signal line to the MCU 110, in which case the software of the MCU is able to manage the structure of the radio packet and retrieve the pertinent payload data. It is recommended to use a chip such as the CC1101 as the overhead of operating the radio demodulator, slicing the input signal, and managing the packet structure of the incoming radio data is easily handled within the CC1101 without any overhead required of the MCU. The CC1101 signals it is receiving a data packet or that a data packet has been received by signaling the MCU 110 via a single signal line causing an interrupt within the MCU 110. The MCU 110 then reads the payload data from the FIFO of the CC1101 using a SPI interface between the MCU 110 and the radio module CC1101 (a given example of radio transceiver 116).

The MCU 110 of the EM 100 may then determine from this demodulated payload data what signals must be sent to the IM via a protocol to which both the EM and IM may be compatible, to pass a query for useful information, or to pass a command to carry out some useful and desired function of the IM. The IM 50 may then execute the command or looks up a status or value in the case of a query and returns that value to the EM 100. The EM may also transmit status, control signals, or queried values back to other components of the lighting system via radio signals 15 by transmitting radio signals back out from the radio module 116. The EM may provide status or light indication 104 signals to the user during use, upon successful handshake with the controllable device, and so on.

A second example configuration included among the various configurations the EM 100 may be used is as follows: The EM 100 may connect to a computer system via USB 102 or other connection. Upon connection to the computer system such as a personal computer "PC", the EM 100 may responds in standard USB "device mode" to the computer system (it may also use "host" mode, or "on the go"/"OTG" USB modes). The EM 100 may draw power 122 from the USB connector 102, which may be regulated to 3 volts to operate the circuitry of the EM 100 if required. This regulation may be performed by the USB controller IC 119. The EM 100 may only require a few milliamps of current to operate in this mode, a current easily supplied by powered USB connections.

A software program which may be loaded on the PC may be started which may be able to communicate via the USB port of the PC to the USB controller 119 of the EM 100 and thereby communicate with the MCU 110 of the EM 100. The software program and MCU of the EM 100 exchange encryption keys in a similar was as discussed above.

The software program may query the HID of the EM 100. The software program may then use a network connection of the PC such as a local area network, wide area network, WiFi, or other network connection that is able to communicate with a computer server on the network, which may typically be located behind a firewall on the public internet. The software program of the PC may send a query using an encrypted internet connection to the remote server—sending the HID of the attached EM 100. The remote server may look up the given HID in a database, and may retrieve a list of all the license flag bits set for the given HID for all EQID's currently in production. The remote server may send the list of EQID's along with the license flag bits back to the software program on the PC. The software program on the PC then sends one or more of these EQID's along with the retrieved flag bits to the MCU 110 of the EM 100. The MCU 110 of the EM 100 may store these flag bits in a nonvolatile memory such as an EERPOM which may not be easily tampered with.

The software program of the PC may also send commands to the MCU 110 of the EM 100 which may cause the radio transmitter 116 of the EM 100 to become active and to communicate with other portions of the lighting system to provide realtime status or other means of updating the various portions of the lighting system in a similar way.

Thus, the user may easily synchronize settings and feature license keys quickly and easily with a remote database which may be maintained by one or more administrators, for example the manufacturer of one or more controllable device, or other third party.

It is also possible for a user to download a firmware for operating the EM 100 from the internet and to load that firmware into the EM 100 via the USB connection 102. This may make it easy to update the firmware of the MCU 110 of the EM without the user having to send it back to the factory. Similarly, the connection could reprogram firmware of the MCU 54 of the IM 50 while the EM 100 is connected to the external connector 40 or alternately, the EM 100 can store the firmware destined for the IM 50 during an synchronization session with a remote database, and load that firmware into the MCU 54 of the IM the next time the EM is attached to the controllable device having the IM installed.

Either of these methods of firmware update of the EM, IM, or any combination thereof may take place with or without the consent of the user. For example, if it becomes known that license keys or the security of the licensing system has been breached, it may be easy to devise a chain of events whereby certain key software changes, key changes, or code changes are automatically propagated throughout all EM's and IM's currently in operation.

It may be desirable to program the firmware of the EM to require synchronization with an external database at regular intervals to continue operating normally—such as once per calendar month or other desired interval, or in response to certain events such as an attempt to handshake with an unauthorized or non-licensed device.

In any case, it should be insured that the firmware of either the EM or IM may not be easily written or overwritten by other than authorized sources to prevent malicious users from disabling or tampering with the licensing facility designed into the present invention.

An example External Module EM 100 may be generally constructed as follows, though someone skilled in the art of electronic circuit design, embedded systems design, and computer software may design the physical embodiment with minor alterations without departing from the spirit and scope of the present disclosure. An EM 100 may include a physical enclosure 125 which may enclose a (printed circuit board) PCB 129. The enclosure 125 may be made of any durable ridged and light weight material. Some embodiments may use is a light weight aluminum which may be electrically connected to the ground plane of the PCB 129 which may serve to effectively enlarge the ground plane which may be desirable for increased sensitivity of the radio module 116 by providing a larger counter plane to the antenna. This may also limit emissions of EMI from the EM 100, and may help provide some immunity to EMI coming from sources outside the EM, for example, limiting the EMI and electromagnetic pulse induced into the internal circuitry of the EM by controllable device which may include a high voltage xenon tube—the activation of which produces substantial EMI and EMP when activated. Plastic such as PVC or ABS may also be used as a lower cost option.

The external enclosure may provide an electrical connector 101 and a USB connector 102, or may provide a single connector which may be able to carry both control signals to an IM 100 and USB. The electrical connector 101 may be designed to mate with the electrical connector 40 (FIG. 7) provided on the external enclosure of a controllable device 20 which is electrically connected to an IM 50 installed internal to the controllable device 20.

The PCB 129 of the EM may include a radio module 116 such as a CC1101 radio transceiver available commercially from Texas Instruments, Inc, a clock source or crystal 117 for creating the intermediate frequency to drive the radio module. The PCB may anchor an antenna 103, or a connector to be used for the placement of an antenna such as an RP-SMA screw type connector. Circuitry or various tuning components 118 such as a matching balun may be designed between the radio 116 and antenna 103.

The PCB 129 may include an MCU 110, and if required a second clock source 124 required by the MCU 110 either internal to the MCU or external to the MCU. The PCB 129 may also include an integrated circuit which may be configured to be difficult to be tampered with. The integrated circuit may store a unique HID, such as for example, an Atmel T88SA102S and/or an Atmel AT88SA10HS 112, 113 integrated circuit. The HID may also be stored internal to the MCU on FLASH or EEPROM type memory.

A non-volatile memory (such as for example an EEPROM) may be provided for storing license bit flags keyed to various EQID's, either internal to the MCU or external to the MCU. A user interface 104 such as buttons, displays, or status lights may also be provided on the PCB 129 and exposed through enclosure 125.

Signal lines may be provided to the external connector 101 from the MCU of the EM directly or via some additional filtering or logic control circuitry. Generally the EM may be able to route the sending and receiving of some sort of serial or parallel data stream to the external connector. It is recommended to provide also at least one signal line to be used as an "immediate action" or "time sync" signal line, a line that is generally not affected by the latency induced by the task of sending serial data. This line can be used to signal time critical events such as the trigger synchronization of a camera shutter to the activation of the controllable device directly to the IM. It may also be used to mark specific events in time, for example, to synchronize characteristic time delays between several wireless or wired devices.

The PCB may include a power regulator 115 to manage power source 121 from an IM 50 via the external connector 101, sourced via a power supply internal to the EM such as a battery or charged capacitor, or sourced from a powered USB connection 102. The PCB may also include includes a USB connector 102 port and a USB controller or chipset 119 which may be connected to MCU 110.

It may be desirable to include optionally a switching means 120 which is controllable by MCU 110 which when thrown, allows the various signal lines going to radio module 116 (such as SPI interface lines, CSn, GDO2, GDO0, interrupt signals, etc) to be directly accessible from electrical contacts of connector 101, or signals passed through various isolation components (such as opto-isolators). This makes it possible, if allowed by the firmware of the MCU 110 on EM 100, to provide direct access to the radio module for a desired task to anything internal to the controllable device having access to external connector 40. It may occasionally be desirable to allow circuitry or components external to the EM to have direct control of the radio module.

FIG. 19 is an example system configuration in accordance with various embodiments. As illustrated, the EM 100 may provide additional connectors or ports which may be used to attach physical cables 151 or wires which may lead to other additional equipment. For example, a photographer may use three photographic lights placed physically near each other. An EM 100 may be attached to a single light. The EM 100 may then route control signals via the additional connector to both the first light to which the EM is attached, and may also simultaneously, or as directed, send and receive signals from electrical connectors on the exterior of the other two lights. In effect, multiple devices may be "daisy chained" together and controlled by a single EM, IM, or combination thereof. Similar effect may be achieved by placing a "Y-splitter" type cable between the EM and IM. The actual embodiment of daisy chaining may be in the form of a second external connector similar to connector 101 which may provide a "pass-through" function to chain devices together directly. It is also possible per FIG. 19 to provide a cable 151 having multiple interface connectors 150 which accept an external connector 101 on one side, and connect to an external connector 40 on the opposite side. This chain cord may be inserted between the EM connector 101 and IM connector 40.

An EM 100 may provide a light sensing means (not illustrated, but easily implemented by one skilled in the art) such as a visible light or infrared light sensor. This may be used to analyze or be aware by the MCU 110 of pulsed light data signals that may be emitted by some controllable device. Additionally, in closed confined areas, it may be possible to use a light sensor to sense the emission of light from a lighting device in a very short period of time, and cause the controllable device via an instant action line to activate. This activation sync pulse may be generated by radio, but there may be some modulation delays, required time for a radio preamble, etc, which may be avoided in sensing just a light signal, which may be beneficial in some cases.

For example, an EM 100 having a light sensor capability may be attached to a studio flash unit. There may also be, in the immediate environment, a second flash unit such as a Canon 580EX SpeedLite which may be using optical data signals to communicate with a master device such as a Canon ST-E2. The light sensor of the EM may be aware of the digital communication, and when a period begins to transpire in which it is expected a trigger pulse of light will be emitted by the master ST-E2, the EM can wait for this single trigger, while ignoring the previous pulses comprising the data portion of the signal, and when observing the signal trigger light pulse from the ST-E2, may cause the attached studio flash unit to activate in potentially less time than would have been required to activate the EM by radio signal.

Referring now, generally, to FIGS. 22-28, the connection between an EM 100 and an IM 50 may also alternately be routed through a third module such as an Auxiliary Module 250, hereafter "Aux Module", or "AM". The AM 250 may provide additional signal logic or filtering, may contain some or all of the circuitry included on the EM 100, may contain some or all of the circuitry provided on the IM 50, or any combination thereof.

An AM 250 may provide several useful functions. In some cases, controllable device 20 which may be small and compact, such as battery powered flash units 300, may not provide enough space in the interior of the flash unit for the location of the IM 50, or some or all of its circuitry. The space immediately inside the enclosure of such a device may not provide the physical relief required of an external connector or some or all of the circuitry required by the IM 50. In such a case, (FIG. 26, FIG. 27, FIG. 28) some or all of the IM 50 or external connector may be moved to the exterior of the controllable device 20 and placed in or on a third enclosure 252, which may be permanently, semi-permanently, or temporarily mounted to the exterior of a device of controllable device 20. The IM circuitry placed inside an AM 250 may be electrically connected to the controllable device 20 by connecting to a pre-existing connector on the exterior of the controllable device installed by the original manufacturer of the equipment, or may be routed to the interior of the controlled equipment via a small hole 301 drilled in the exterior of the controllable device 300 and the exterior 260 of the AM 250, the electrical signal lines 51 or wires passing between the two.

The enclosure of the AM 250 may also provide additional physical anchor points to securely hold an EM 100 when in place. This may be valuable in applications where the equipment may be handled or moved around a lot during use such as may be the case with small portable battery powered flash units, or the like.

The AM 250 may be able to act alone or as an intermediate between or inclusive of the functions described above pertaining to the EM, IM, or any combination thereof.

Figure 25:
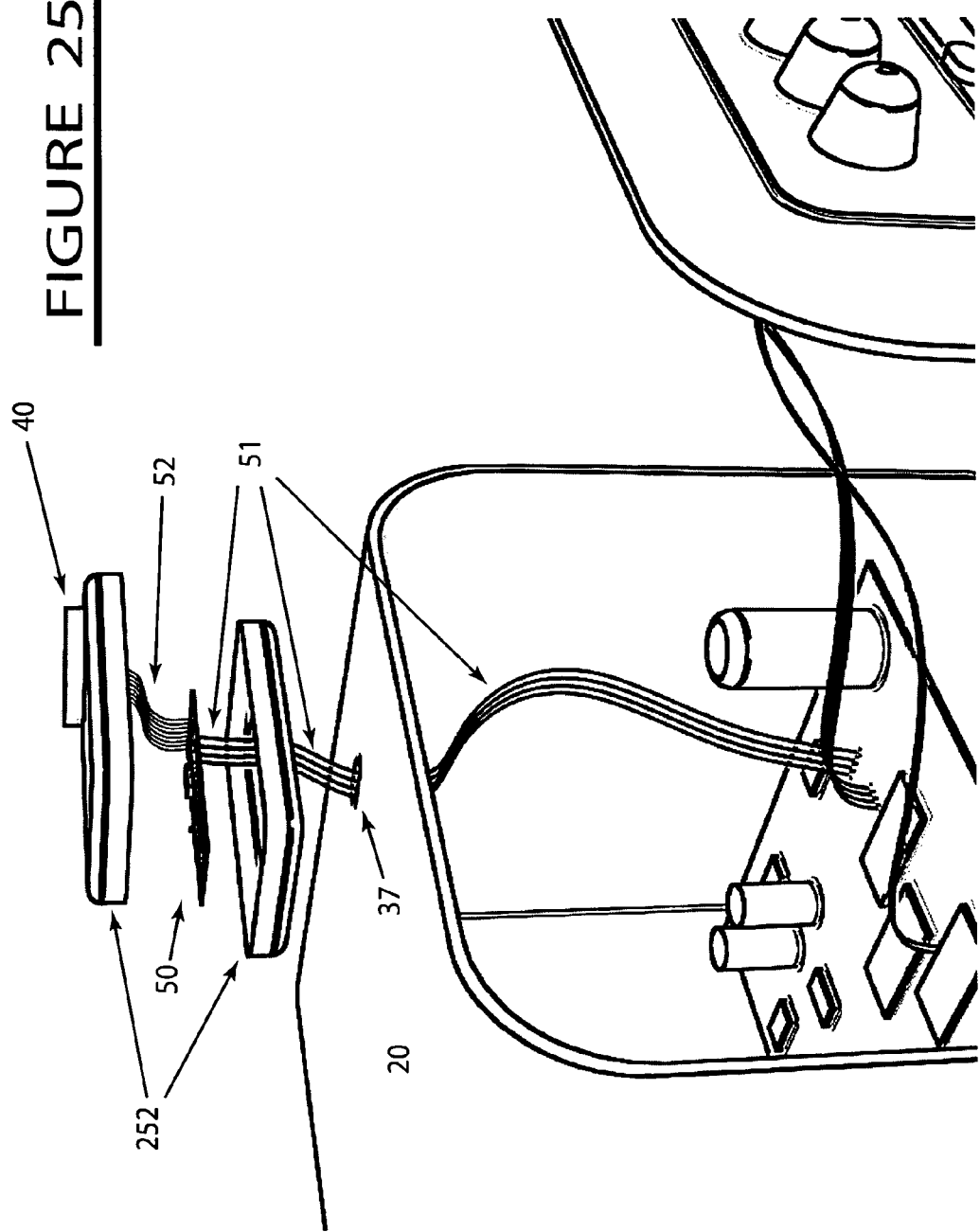
FIG. 25 is an exploded view of an Internal Module installed external to controllable device showing signal lines routed to an interior of a controllable device.
Figure 26:
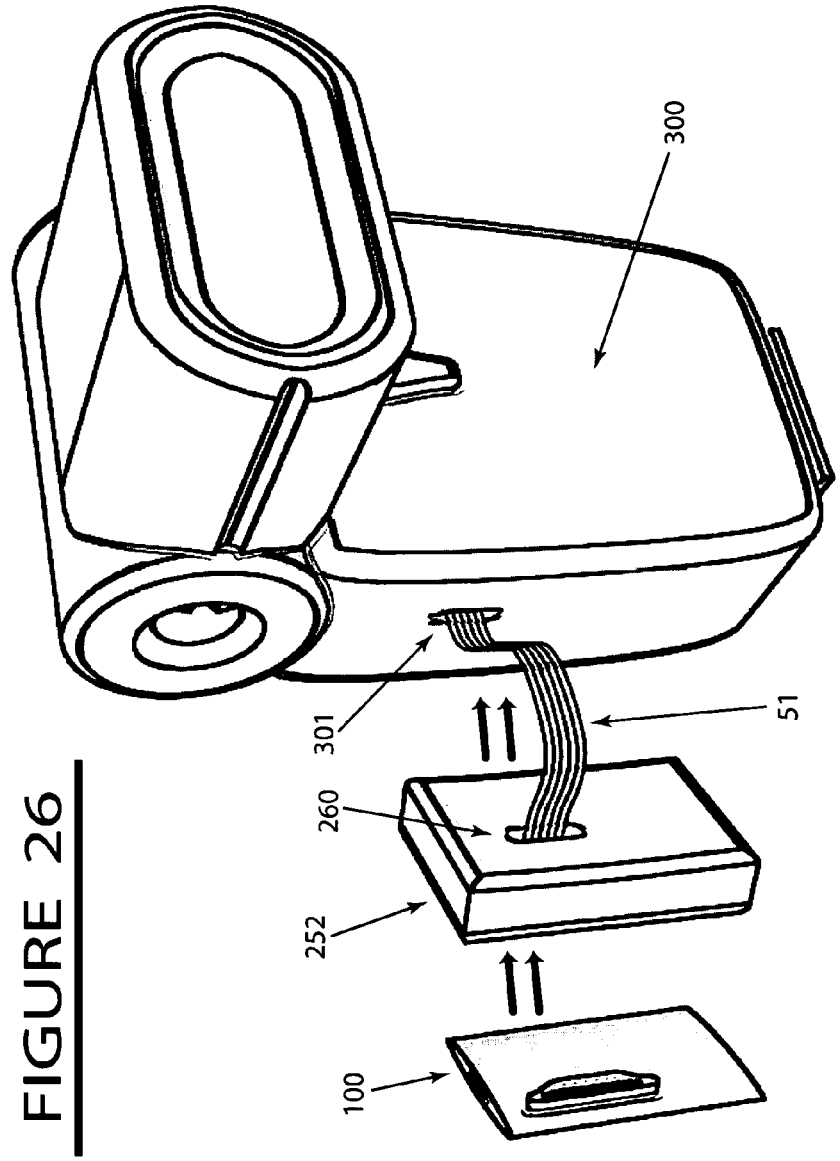
FIG. 26 is an exploded view of a battery powered flash installed on an Internal Module or an Auxiliary Module on the exterior surface of a hand held flash unit.
Figure 27:
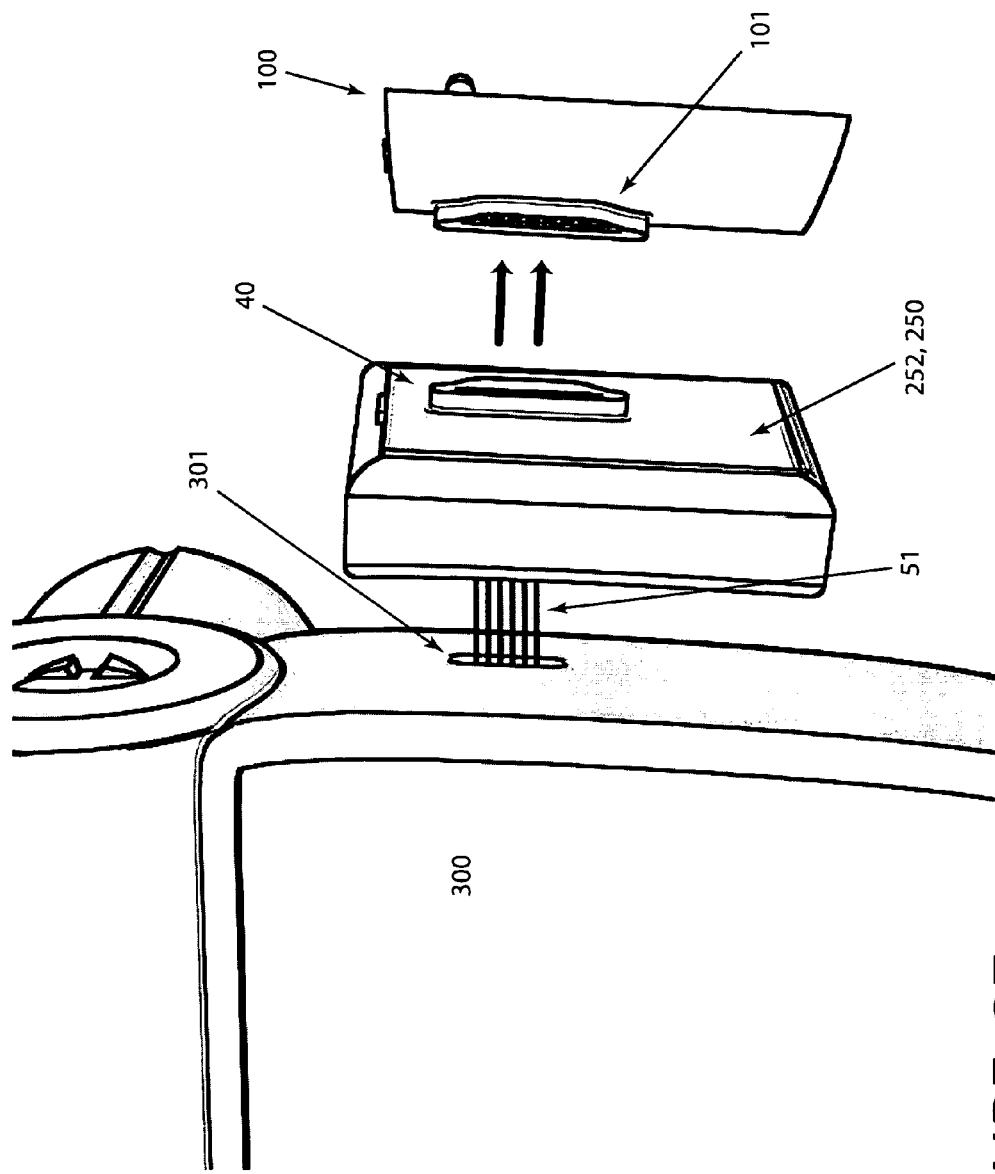
FIG. 27 is an alternative view of the example installation illustrated in FIG. 26.
Figure 28:
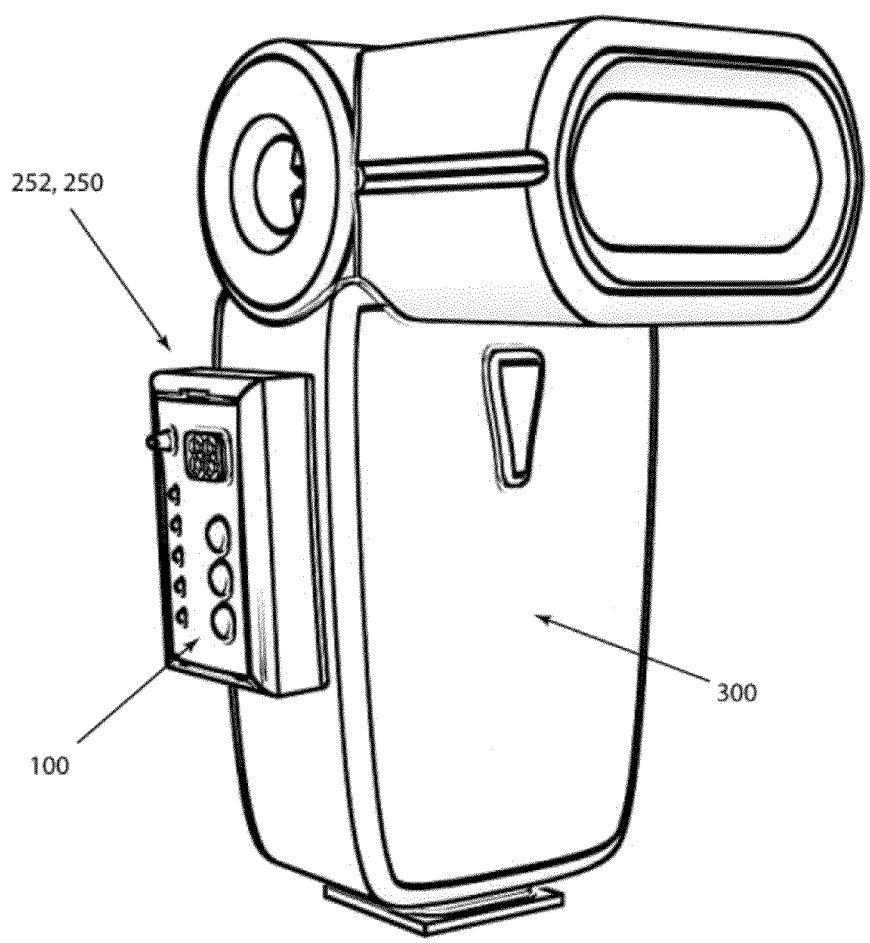
FIG. 28 is a perspective view showing a battery powered flash installed.
Figure 29:
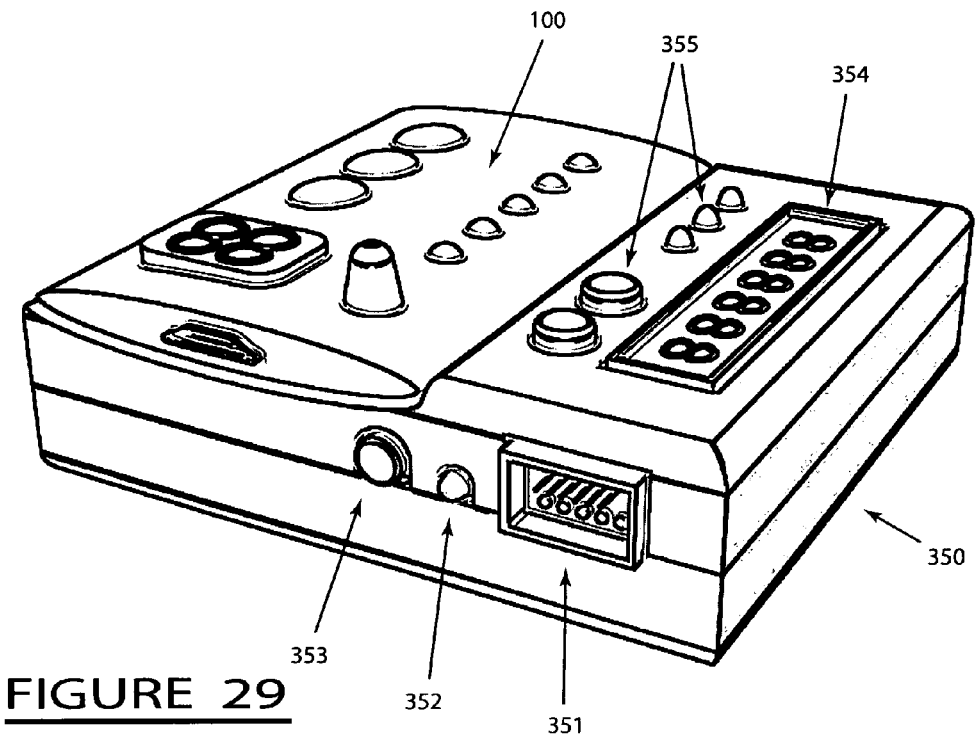
FIG. 29 is a perspective view showing an Intermediate Device attached to an External Module.
Figure 30:
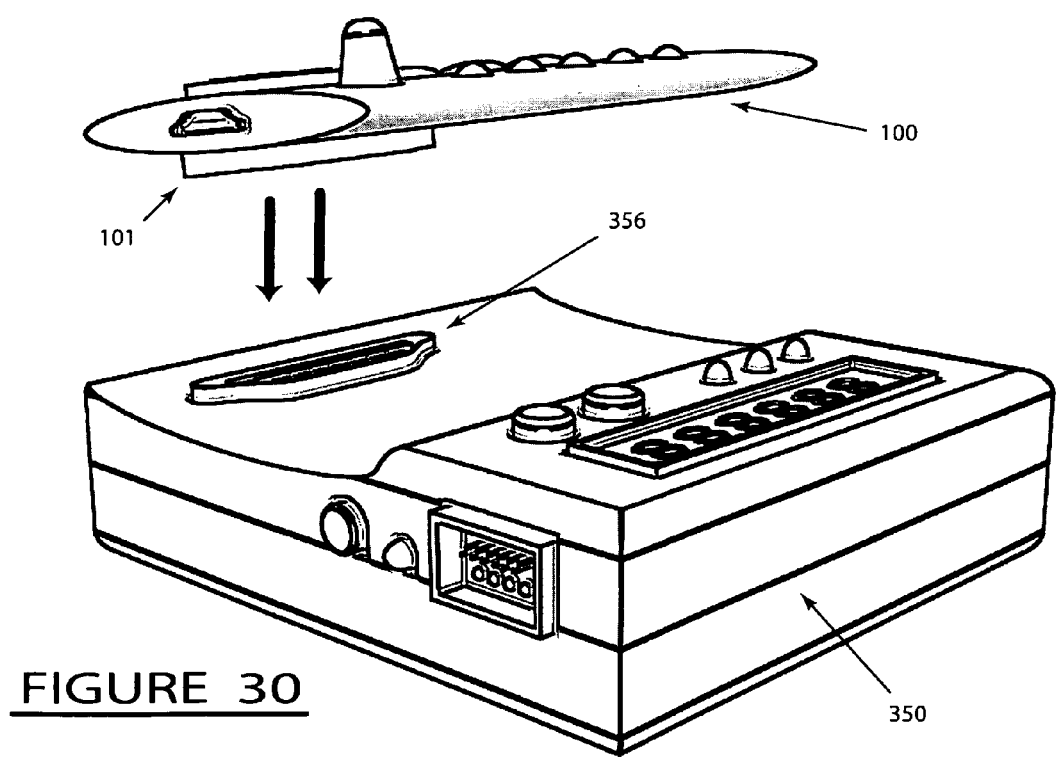
FIG. 30 is a perspective view showing an Intermediate device showing attachment of an External Module.
Figure 31:
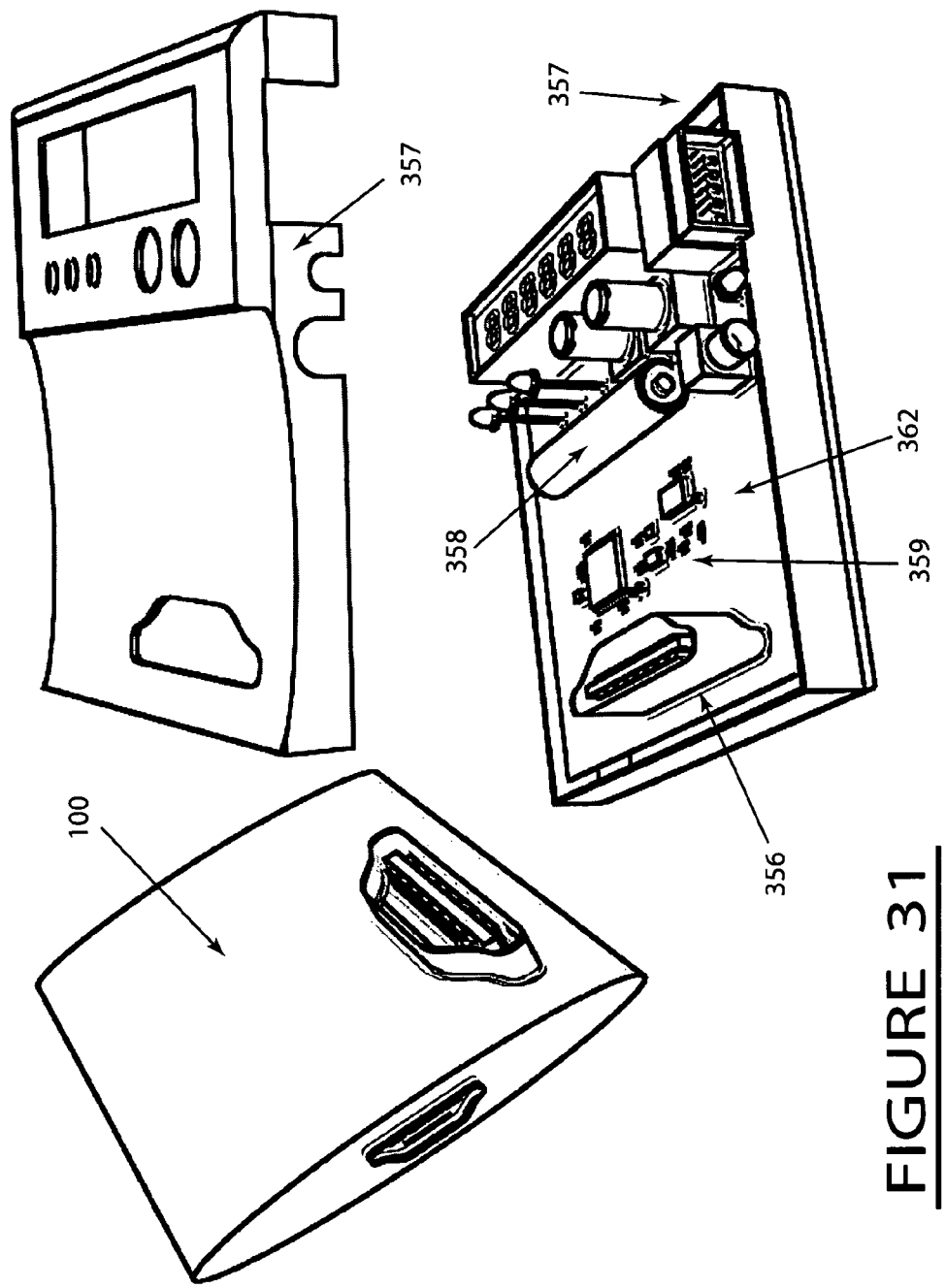
FIG. 31 is an exploded view of an Intermediate device showing internal parts.
Figure 32:
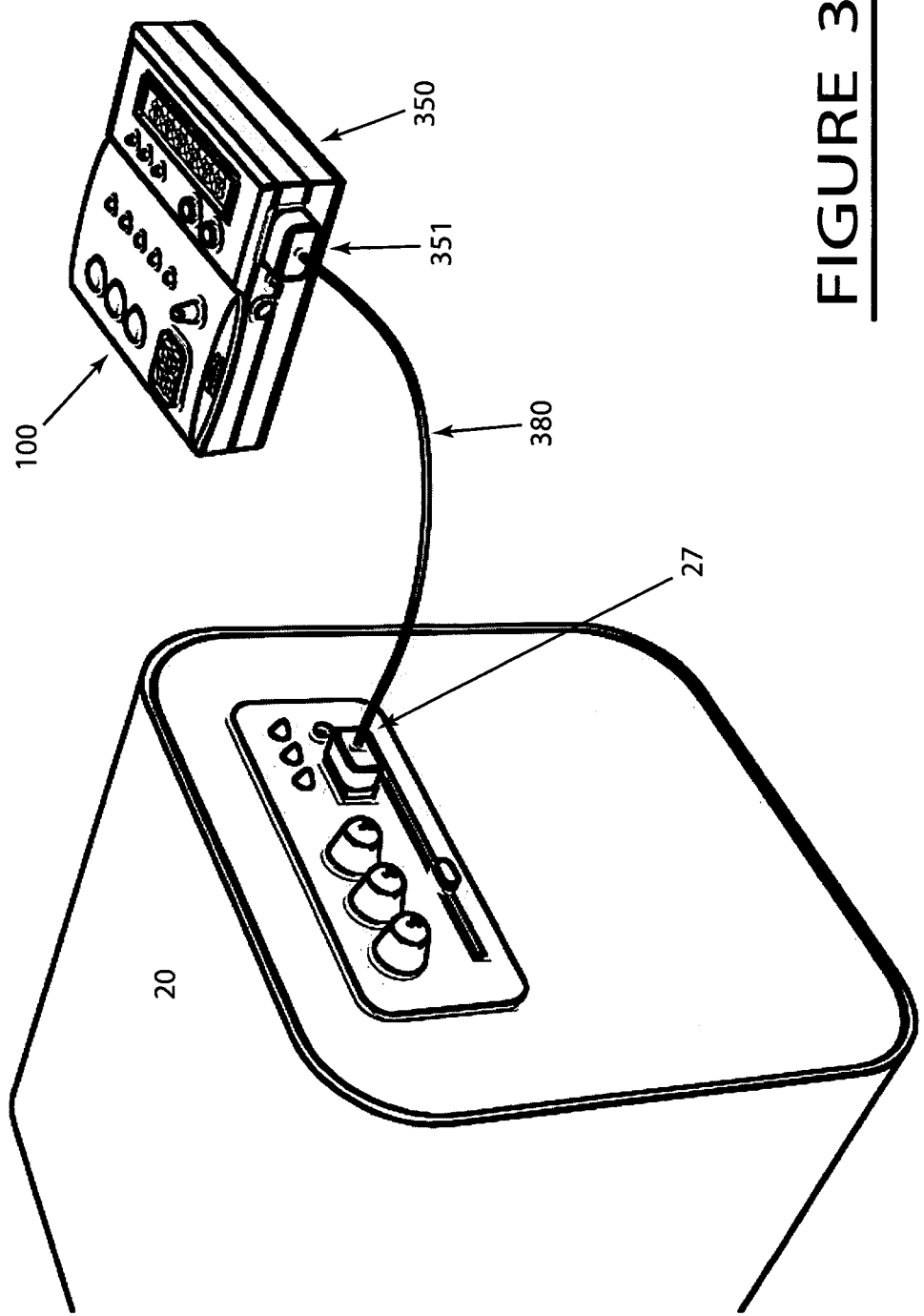
FIG. 32 is a perspective view showing an Intermediate Device using a data port for communication with a controlled device.
Figure 33:
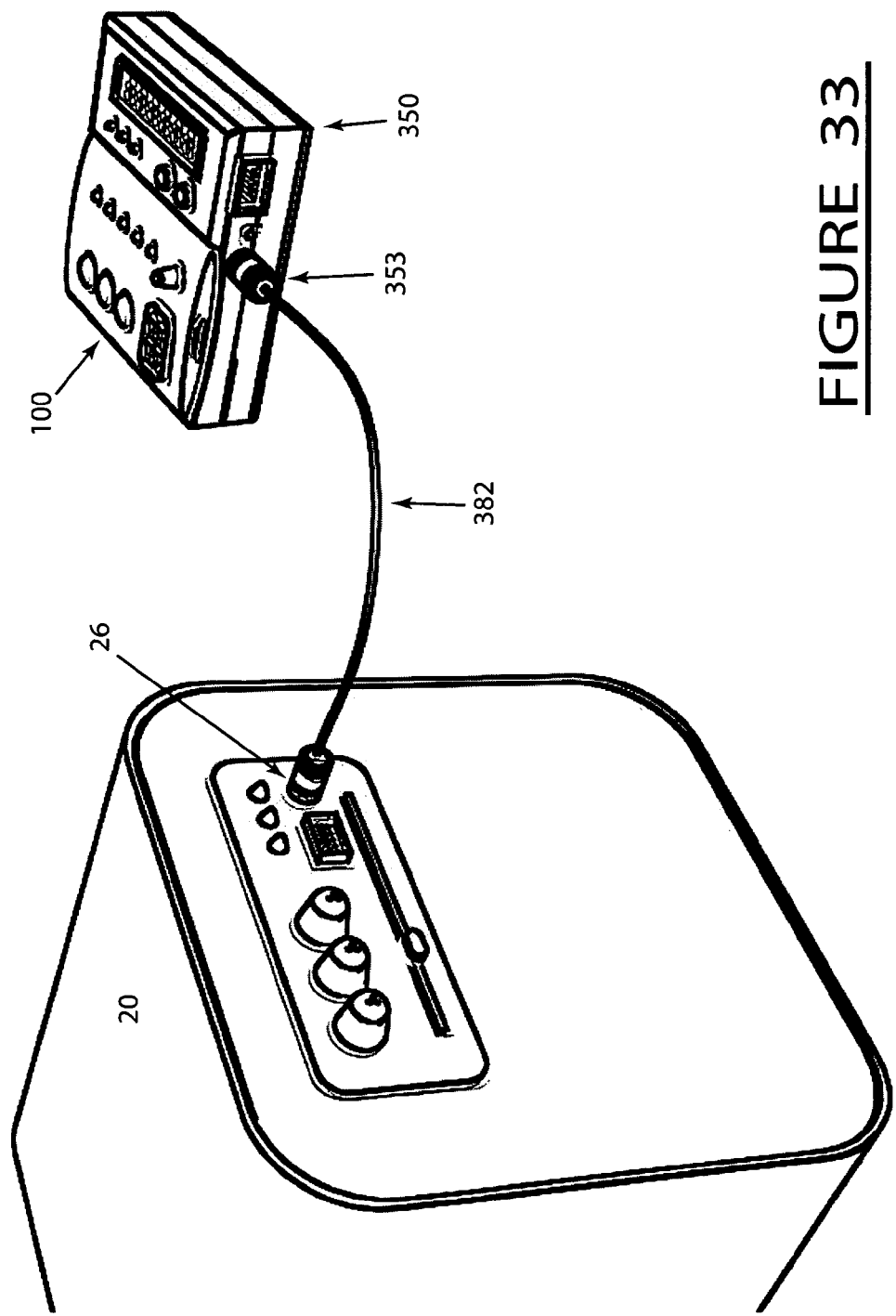
FIG. 33 is a perspective view showing an Intermediate Device using a Sync Port for communication with a controlled device.
Figure 34:
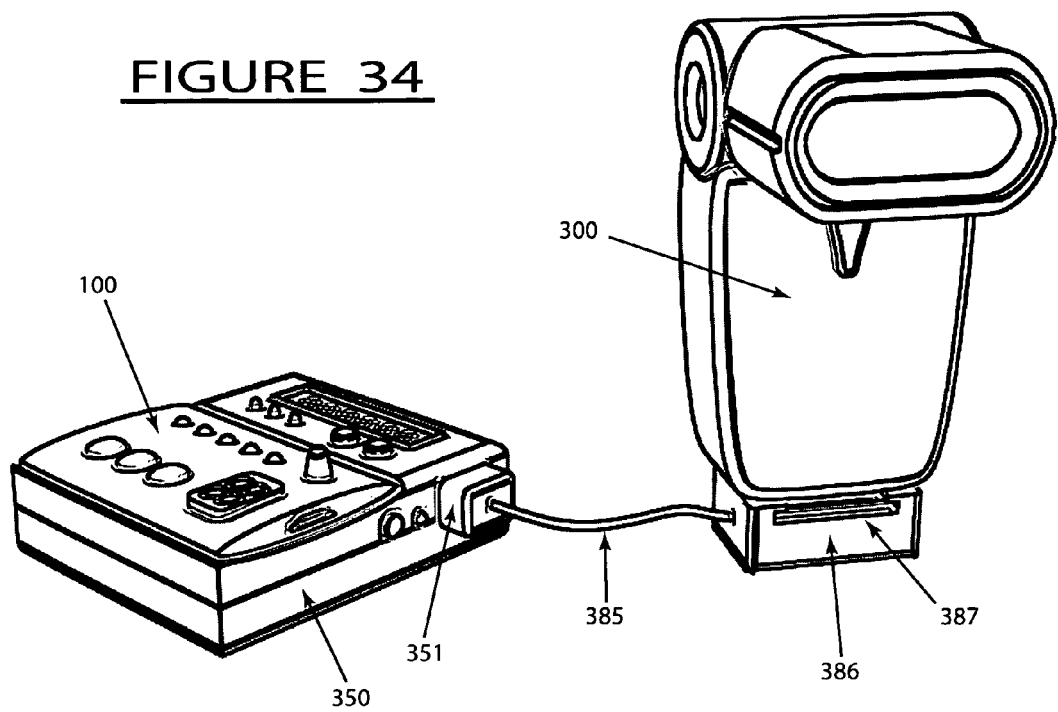
FIG. 34 is a perspective view showing an Intermediate Device using a data port to a hot shoe for communicating with a camera mountable flash using a data port to communicate data signals to or from the data contacts provided by the hot shoe of the camera mountable flash.

Per FIG. 25, in a similar way, it is possible to locate the entire internal module 50 in an enclosure 252 external to the controllable device 20, allowing signal lines 51 to pass through holes 260 in the enclosure 252 and holes 37 in controllable device. The assembly permanently or semi-permanently, or removably placed exterior to the controllable device 20.

The AM 250 may provide additional connectors or ports which may be used to attach physical cables or wires which may lead to other additional equipment to be controlled by the present invention, allowing for "daisy chaining" of controllable device as previously described.

FIGS. 29-35, illustrate an example Intermediate Device 350 in accordance with various embodiments. The Intermediate Device 350 may provide a connector 356 or a cord or cable leading to such a connector 356, for the mating attachment of an EM 100 or another apparatus having a radio signal reception means. The Intermediate Device 350 may having its own power source 358 such as a battery, placed inside an enclosure 357 (or alternately an Intermediate Device having no battery or power source if the intermediate device is intended to mate with an apparatus having a radio signal reception means if the apparatus having a radio signal reception means has its own power source and is able to share this power source with the Intermediate Device; or where the Intermediate Device 350 and/or apparatus having a radio signal reception means is able to draw power from equipment being controlled by the Intermediate Device via any electrical connection or port present on the controllable device, or where the Intermediate Device is able to draw power from a battery pack or energy storage device separate from the Intermediate Device, which may be electrically connected to the Intermediate Device or may power the Intermediate Device through another device), and having circuitry 359 independent from or substantially similar to the circuitry provided by an IM 50 of the present invention. The Intermediate Device generally may not have a radio signal communication means, but when mated with an EM 100 or similar apparatus, the EM 100 may be able to communicate with the circuitry 359 in a similar way as previously described in interfacing with an IM 50. This communication between EM 100 and Intermediate Device 350 may provide radio signal, or other wireless communication, ability to the Intermediate Device 350 via the radio facility 116 provided in an EM 100.

Figure 35:
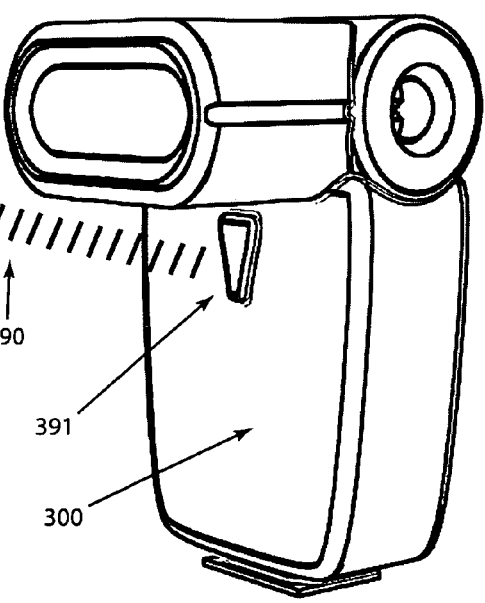
FIG. 35 is a perspective view showing an Intermediate Device using optical signals for communicating with a controlled device, such as coded digital pulses and/or trigger pulses.

An Intermediate Device 350 may provide signal inputs or outputs including but not limited to the following: A user interface 355 which may operate with, or in place of, the user interface 104 provided on EM 100, and/or a feedback or information display 354 for providing information to a user; and a data port 351 (FIG. 35) which may be able to communicate signals with various controlled equipment. FIG. 35 illustrates an Intermediate Device 350 communicating via data port 351 through a connector cord 380 with a controllable device 20 using the data connector 27 of the controllable device 20.

A data port 351 (FIG. 34) of an Intermediate Device 350 may also be used to connect to contacts present on the hot shoe 387 of a controllable device such as but not limited to a battery powered flash unit 300, via a cable or adaptor 385 and a housing 386 which may electrically connect the conductors of cable 385 to the appropriate pins, contacts, conductors, or ports 387 present on controllable device 20, 300. This configuration, may allow an Intermediate Device 350 to send and/or receive communication signals to or from a controllable device 20, 300. These signals (such as for example serial data streams sent to, or received from, contacts present on the hot shoe of a lighting device) may indicate the current configuration and capabilities of the controlled equipment 20, 300, as well as causing the controllable device 20, 300, to activate or perform some desired useful function such as changing the position of the zoom motor in the lighting head of the device 300, or the like. With the insertion of a radio receiving device such as an EM 100, the Intermediate Device 250 may in effect control the operation of lighting device 20, 300 wirelessly using radio signals.

A synchronization port 353 (FIG. 33) such as a mini-phono (⅛") jack or other jack which may provide an electrical ground and one or more signal lines which may be used to activate a controllable device 20. The port 353 may provide a pc-sync activation/trigger signal line and may also provide a second line used for a 'quench' signal—which may be used to cause some flash units to stop emitting light. The sync and quench signals may be paired on a single sync port 353 by using a standard ⅛" "stereo" port which allows for two signal lines and a ground. The use of a two signals to activate and 'quench' a lighting device is described in detail in US Provisional Patent Application 61/112,731 "System for Remote Wireless Control of TTL Camera Flash Intensity Via Radio" filed by Kevin King, also an inventor of the present invention, incorporated in its entirety to this disclosure for reference. The sync port 353 may be connected using a cord or adaptor 382 to a sync port 26 present on the controllable device 20 normally used to activate the controllable device in synchronization with a camera shutter.

A light source 352 such as but not limited to a visible light LED or an infrared LED ("light emitting diode"), which may provide pulsed light data signals, synchronization signals, activation signals, signals timed by duration to which a controllable device may be responsive (for example, many battery powered flash units from Nikon Corporation such as for example, an SB-800 Speed Light using "SU-4" mode) to a controllable device. FIG. 35 illustrates the combination of the wireless communication ability 116 of an EM 100 receiving commands by radio signal 12, 15, and sending those commands to an Intermediate Device 350 of the present invention, and that Intermediate Device 350 pulsing a light source 352 to send pulsed light signals 390, which a lighting device 300 having an optical signal receiver 391 is responsive. This may be used, for example, to send a pulsed light signal from a light source 352 of a characteristic timing, pattern, and binary content, which may cause a lighting device 300 to activate at a desired output power and mode.

An Intermediate Device 250 may be any device which may be placed electrically or logically or within a signal path between an apparatus having a radio reception ability and a piece of equipment, whereby the presence of both the Intermediate Device 250 and the apparatus having the radio reception ability may provide an end user an ability to wirelessly communicate with the controllable device 20 via the apparatus having radio reception ability and the Intermediate Device 250; and whereby the controllable device may lose the described wireless communication ability if either the Intermediate Device 250 or the apparatus having radio reception ability is removed from the communication and control system (some wireless communication with the controllable device may still technically exist if the controllable device had another means of wireless communication that would generally act in parallel or in place of the combination of a radio reception apparatus and an Intermediate Device 250 as described in this discussion); and whereby the Intermediate Device 250 may provide some logical or analog altering, filtering, rearranging, conversion, or other process via microprocessor or discrete circuitry to a signal, signals, or data coming from an apparatus having a radio reception ability prior to sending that signal to a controllable device internally or externally to the controlled equipment via some connector or port of that controllable device. For example, any intermediate system, circuit, adaptor, processor, or filtering being placed between an apparatus having radio signal reception ability and a signal input of a controlled equipment, excluding only simple devices which provide straight pass-through—for example, the direct electrical connection (or other arrangement substantially similar to a direct electrical connection such as connections via switches, opto-isolators, magnetic chokes, etc) of the electrical conductors of an apparatus having a means of receiving radio signals to the electrical connection to an external port or internal contacts of a controllable device; any other implementation should be considered subject to read upon the spirit and intent of an Intermediate Device 250 in accordance with present disclosure.

Figure 36:
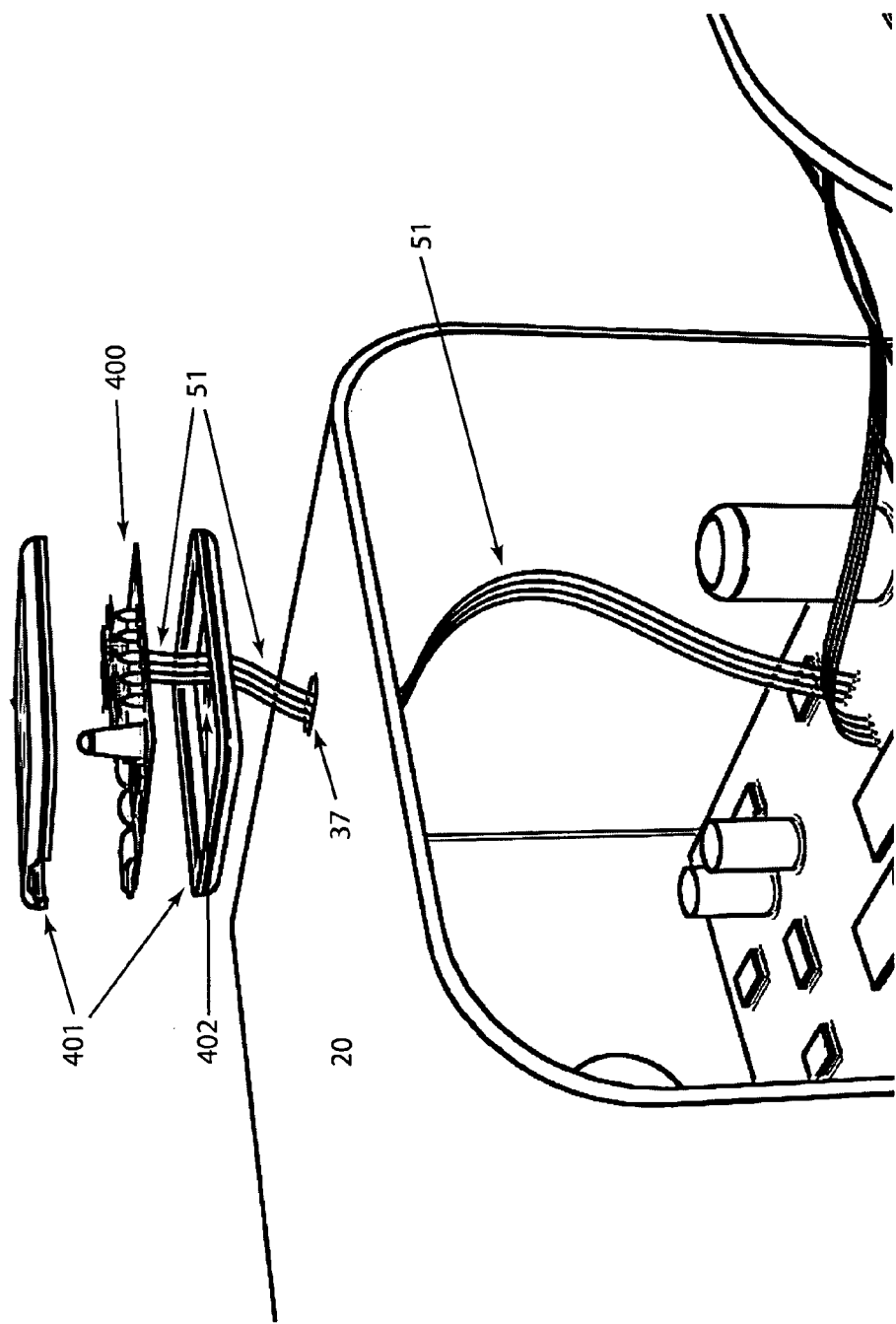
FIG. 36 is an exploded view showing combined functioning of an external device coupled a controllable device.
Figure 37:
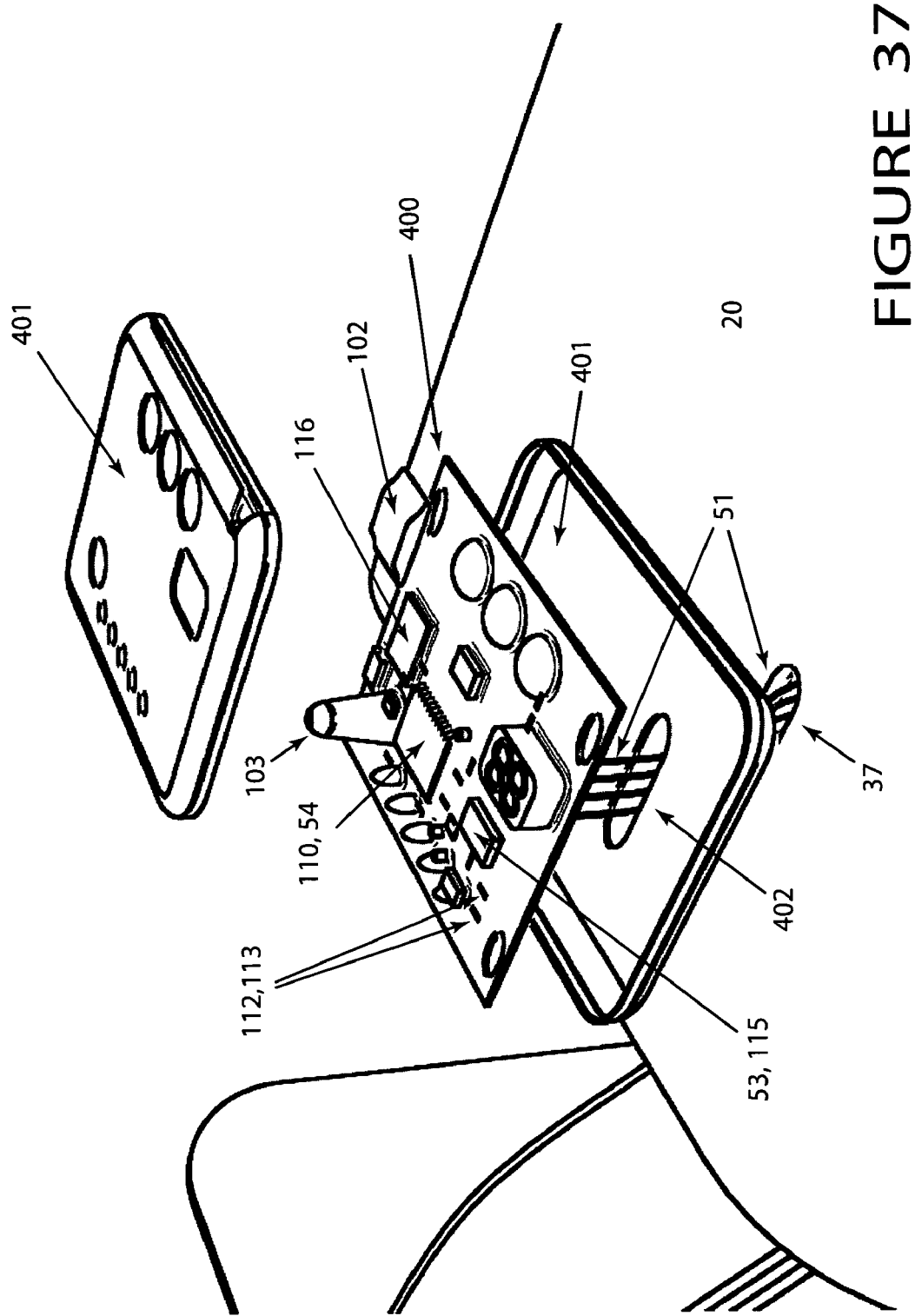
FIG. 37 is an exploded view showing combined functioning of an external device coupled a controllable device showing internals and components.
Figure 38:
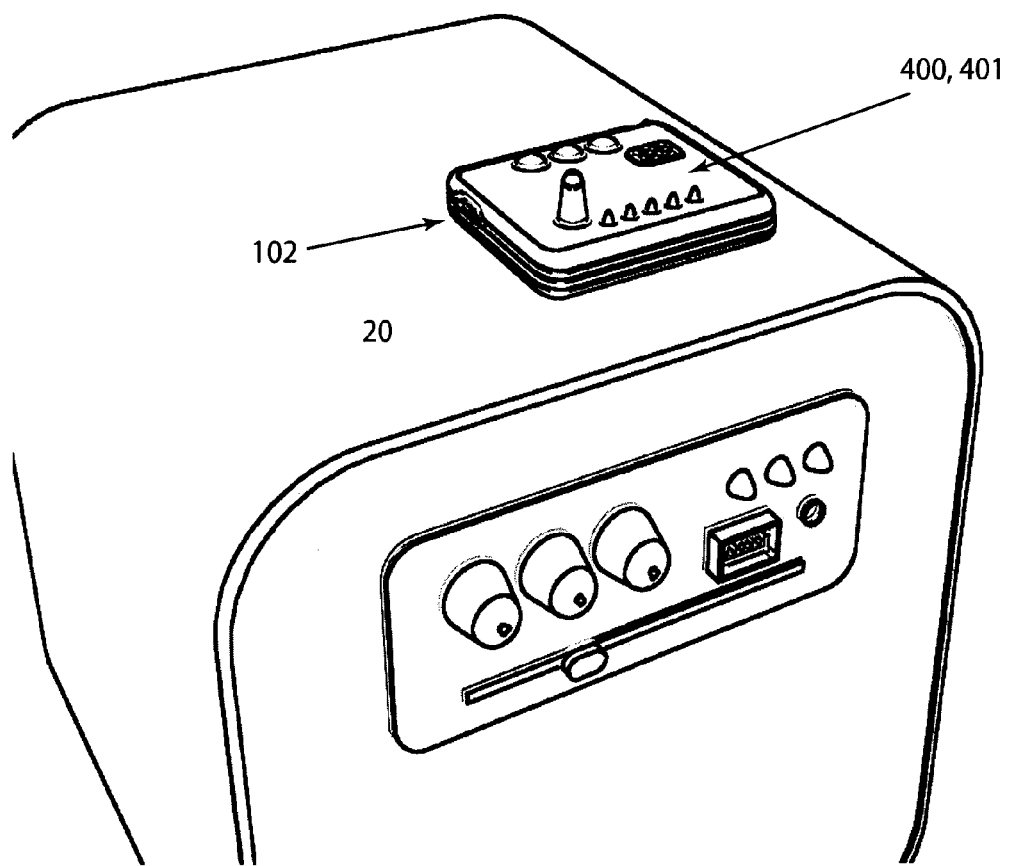
FIG. 38 is a perspective view showing an external device installed on a controllable device.

Referring now generally to FIGS. 36-38, wherein another example system according to present disclosure is illustrated. A device 400 may have significantly similar functionality or abilities of the present invention IM 50 and/or EM 100 or any abilities, interfaces, interactions, or methods to splice into various signals within various controlled equipment and so on, whereby the radio or wireless communication facility of an EM 100, and the ability to interface with controllable device of an IM 50, using any of the methods described in this disclosure, are combined into a single device 400 which is able to electrically connect to the internals of a controllable device, and whereby the device 400 is located exterior to a controllable device 20, and whereby the signal lines 51 between the device 400 and the circuitry 29 of the controllable device exit through an opening 37 in the external enclosure of a controllable device 20.

A Combined Function External Device 400 may be installed optionally in its own enclosure 401 and may optionally provide also a USB port 102 or other interface whereby the firmware of the microprocessor of the device 400 may be easily updated, along with the updating and use of license keys or license flag bits from a remote database as previously discussed in this disclosure.

In effect, a Combined Function External Device 400 in accordance with present disclosure may be capable of performing the functions, or any sub-set of the functions, as described previously in this disclosure by any combination of the IM 50, EM 100, AM 250, and Intermediate Module 350 which may be interfaced with a controllable device 20, 300 using electrical connectors or signal lines 51 which may be passed through the exterior enclosure of a controllable device 37, and whereby the radio transmission and/or radio reception apparatus 116 of the system is not physically removable from the control system as would be removable had a separate EM 100 been used.

Signaling Using Optical or Light Signals:

In some embodiments control signals, marked timing events, or other various signaling data may be passed between any of the EM, IM, or AM using pulsed light or other optical signal. This would may possible signaling where physical connection between devices is impractical or not required.

In one example, the EM 100 may include a light signal source such as but not limited to an infrared LED. The EM may then be able to be connected to the exterior surface of a flash unit which may include an optical trigger circuit or "optical slave" as known in the industry. A light pulse may be sent from the EM 100 directed out an exterior window placed within optical line of sight of the optical slave present on a lighting device. This may allow the EM to directly perform the simple operation of triggering the lighting device without having to alter any internals of the lighting device. The activation of the lighting device 20 may be in response to receiving a command by radio signal.

In another example, the EM may be used to communicate signals to controlled equipment where it is not desirable to provide an electrical connector to the exterior—such as in applications where the controllable device is used in harsh environments with water, used in underwater housings, and so on.

The light based signal may also be sent or received or combination thereof using fiber optic signaling, or using light sending and light reception systems such as those designed for digital audio used in home theater applications.

Signaling Using Magnetic Fields or Ultrasonic:

Some embodiments may embody an IM and EM that may be able to communicate with each other by pulsed magnetic fields, ultrasonic signals, and audible sound tones; instead of or in addition to an actual electrical connection via connectors such as 101 and 40.

As the IM and EM may only need to communicate through a thin exterior enclosure of controllable device 20, it is possible to pulse a source of some magnetic phenomenon on one module, and the opposite module, having a means of observing the time the phenomenon is occurring and not occurring, is able to observe any pulse structure presented by the phenomenon.

Embodiments may use magnetic fields, for example, by pulsing a magnet or inductor on one device, and observing a reaction on a magnet or inductor on the opposite device, assuming the devices or at least magnets or inductors wired to each device.

The IM and EM may be placed at the same general location on the exterior enclosure of the controllable device, having only the enclosure of the controlled equipment separating them. If a magnetic field is produced by sending current through an inductor on an EM, a corresponding inductor on the IM would show a voltage or current spike also in response to the magnetic field produced by the EM. If this field is pulsed on and off at given intervals, it may be easy to use the pulsing pattern as a basis of digital data and thus serial communications. A similar approach may be taken using audio or ultrasonic bursts of sound or tones.

This additional embodiment may be useful in applications calling for operation in harsh environments were an electrical connector is not feasible, or in applications requiring undisturbed aesthetics of the exterior of the controllable device, as a magnetic or ultrasonic transmitter or receiver may be concealed just under the surface of most manufactured items.

Signaling to Other Standard Connectors, Protocols, and Systems:

In some cases an External Module may communicate directly with, or via a second AM, a piece of controllable device via a connector or data port. Examples may include serial or other control signals to a camera hot shoe or other signal port provided on the camera, such as a zoom or shutter control, a similar port on a flash unit such as a hot shoe; as well as communicating with other industry standard command and control systems not normally associated with the field of photography, such as a Music Instrument Digital Interface or "MIDI" port provided on most electronic musical instruments, audio recording systems and playback systems; similar such control and feedback interfaces which may be provided on audio mixing equipment; interfaces used to control the positioning, timing, programming, or operation of stage or theatrical lighting and effects; interfaces for sending or receiving digital video signals such as for example HDMI, optical and analog audio signals, and the like.

Modules Having Secondary Power Source:

In some cases an External Module may have its own integral Backup Power source, easily replaced by a user such as a standard AAA battery, or source which is not intended to be replaced by the end user. For example a small watch type battery placed in a connector or soldered directly to the PCB. This small power source could provide trickle sleep current to allow the MCU or radio module to perform some tasks when not connected to a power supply of the controllable device, or if said supply is not available.

The Backup Power can keep an MCU or related equipment in a slightly more active state than completely powered down. It can also source momentary pulse current to drive the Radio Module to listen periodically for a radio broadcast, sometimes called "Wake on Radio" ("WOR"), a function provided in some radio chips. This would make it possible for example, to power up a controllable device by radio, even if that controllable device was previously completely powered off—if the act of powering it off would have interrupted the primary power source for the IM and EM.

A Backup Power would allow the Radio Module to listen for a known radio signal command to power up the controllable device and at that time, could cause an interrupt to the IM. If that IM had a means of activating the main power switch of the controllable device, the IM could cause the controllable device to power up and in doing so, the primary power source from the controllable device would become available again and allowing the IM and EM to resume operation in their most fully active configurations without drawing any additional current from the Backup Power.

The Backup Power may be charged by the primary power source during normal operation—such as power provided from controllable device, or a USB port, during a synchronization event. This may be achieved with some types of batteries using simple charging and regulation circuits commonly know to anyone skilled in the art of electronic circuit design.

The battery used in the above example may be replaced by or used together with a resistor-capacitor charge circuit ("RC Circuit"), by which a capacitor is charged during normal use, then Backup Power is sourced by letting the capacitor slowly discharge through a resistor over time or at pulsed intervals. This method may be easy and inexpensive to implement with very minimal PCB space. After a period of normal operation, an RC Circuit could provide standby and WOR services to the controlled equipment for many hours or days following the previous period of normal operation, and could be fully recharged within a few seconds of manually turning on the power of the controllable device.

A photo-electric material such as a solar cell which generates voltage and current in the presence of light may also be used to provide standby and/or WOR services the EM and IM, or to recharge the Backup Power battery or RC Circuit.

In some cases power may be harnessed and stored from various mechanical means such as piezo electric materials which create a voltage when physically disturbed. The act of a user moving around with a module in their pocket or riding in a car could cause some useful power to be built up and stored within the device.

External Card Slots:

In some cases it may be desirable to add a slot or connector to an EM, IM, AM, or Intermediate Device to receive a memory card such as a CompactFlash, Secure Digital/SD type memory card or similar device. The card may include updated license keys or software for either the IM, EM, AM, or Intermediate Device or combination thereof.

In a similar way, a slot may be provided for the insertion of a SIMM card or similar device as used by cellular telephones as an alternate to or in addition to the HID and storage of licensing keys as previously described. The discussed slots may be provided on the exterior of a controllable device, on an EM, IM, or directly on the IM accessible only by disassembling the controlled equipment.

External Module Key Synchronization Communication Via RF Instead of USB:

In some cases the EM may exchange license key information via an encrypted radio frequency communication with third device such as a personal computer using its onboard radio transmitter—for example, it is possible to communicate directly with a computer system having a BlueTooth or WiFi networking capability if the radio module 116 of the EM is capable of sending radio signals matching the BlueTooth or WiFi protocols.

This may enable the synchronization license keys or other software with an EM quickly in the field without the need to disconnect the EM from the controlled equipment, or physically connect the EM to a computer system.

In a similar way, EMs may share license keys between them, or to trade license keys, or to allow them all to draw from a pool of available license keys and manage which EM is currently in use of which license keys.

By communicating license key data by radio, it is possible for an end user, for example, to purchase a license key to use a particular feature on a particular EM. It is possible at some other time he would want to transfer that license to a different EM. Rather than hook each EM up to a computer and access a database, it is possible for the two EMs to coordinate the activation of the given license on the new EM while deactivating the license on the old EM. Both EM's can report the details of the transaction back to the remote database the next time they are synchronized, so the transferred keys may also be reassigned in the appropriate records of the remote database.

External Module with Mesh Networking Ability:

The radio transmitter, receiver, or transceiver provided in the EM may be configured to be capable of joining, controlling, or otherwise participating in a mesh network such as but not limited to ZigBee networks. This may simplify the task of managing a large number of EM's operating in an environment and controlling a large number of controlled equipment. Using a specified radio standard would also help ensure a given EM may be used in a greater number of countries around the world without need of recertification for each country.

This additional mesh networking functionality may be provided via software controlling the primary radio transmitter, radio receiver, or radio transceiver included on the EM, or it may be provided by a second radio transceiver specifically designed to handle the communication, management, and overhead required by a mesh network.

Provisional U.S. Patent Application 61/120,467 "Wireless Radio Mesh Network Camera Flash System with Computer Software Integration" filed by Kevin King, also one of the inventors of the present invention, is incorporated in its entirety for reference. This document discloses the application of mesh networking to the field of photographic systems in detail.

System on a Chip/FPGA:

It is possible to implement substantial function of an IM, EM, or AM using "system on a chip" ("SOC") technology, and/or "field programmable gate array" ("FPGA") technology. These technologies are known to one skilled in the art of embedded electronic system design and microprocessor core design.

In short, a "system on a chip" allows for a complex collection of digital, analog, and logical portions of circuitry to be located on a single integrated circuit, or a micro sized printed circuit board encapsulated in a standard IC package such and an SOIC or DIP package.

In short, an FPGA may allow for the creation of any portion of logic, memory, ports, I/O's, or other circuitry found in a standard microprocessor to be designed in the software realm and when that software is added to an FPGA chip, the chip in effect behaves just as a purpose built microprocessor would have behaved, and may include function normally requiring additional discrete parts or additional IC's external to the microprocessor.

In some cases a single integrated circuit or collection of integrated circuits may be configured according to the current disclosure which may perform all of the function, or a significant portion of the function, or a minimal amount of the function of any combination of an IM, EM, AM, or Intermediate Device.

An example application or embodiment may for example be the design of functions of an FPGA or SOC onto a single IC which may be supplied to camera manufacturers at very low cost. These chips could be added to camera or lighting equipment in large volumes and at minimal additional cost to the manufacturer. This additional circuitry may provide something of a standardized interface with their current products, the interface may or may not have a wireless communication capability, and it may or may not interface to a device external to the camera body or physical enclosure of the given controllable device. In general (but not limited to this example), a manufacturer of controllable device such as but not limited to camera, lighting, or various electronic accessory gear may install an interface to the present invention in the form of an SOC or FPGA type device. The interface may loosely follow the example of the IM described in this disclosure—interfacing with various hardware within the controllable device and optionally having the ability to check for a valid license present in a second device internal to the controllable device, in a memory card slot of the controllable device, or a device external to the controllable device which may communicate to the controllable device using a connector or other various signaling means as previously described.

In effect, this embodiment may make it possible for a manufacturer of controllable device to design a chip or chipset into their products during the development process which may be able to interface characteristic signals to a wireless device which is generally placed external to the controllable device and is able to communicate signals with the SOC or FPGA within the controllable device. Thus, an end customer may be able to use a device such as an EM of the present invention to add a wireless communication capability to the controllable device, and without having to retrofit the controlled equipment with any additional hardware.

External Modules Having Multiple Radio Frequency Bands:

In various embodiments an EM 100 may have multiple radio modules 116, clock sources 117, antenna tuning components 118, antennas 103, or having radio systems 116, 117, 118, and 103 which are selectable or configurable with respect to frequency band directly from the radio module 116 or an attached MCU 110, or any combination thereof; which allows the EM to send and/or receive radio signals in multiple radio frequency bands. Some bands of interest are tuned near 344 MHz, 869 MHz, 902-928 MHz, 2.4 GHz, 5.6 GHz, and others. Having the ability of the EM to operate at multiple frequency bands allows the EM to interact with other lighting systems and wireless photographic control systems which operate (depending on model and manufacturer) around these various frequency ranges.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A control system for use with preconfigured photographic equipment that includes a controllable photographic device controllable by a controlling photographic device, wherein the controllable photographic device has a housing and a controllable device circuit that is included substantially within the housing and that has an upstream portion and a downstream portion coupled by one or more control lines; the control system comprising:
    an internal module configured to be physically located substantially within the housing, the internal module including a signal directing arrangement configured to be electrically and logistically coupled with the one or more control lines of the controllable device circuit between the upstream portion and the downstream portion; and
    an external module configured to be physically located substantially outside of the housing, and further configured to be electrically and logistically coupled with the internal module, the external module including a signal receiving device capable of receiving at least one wireless control signal from the controlling photographic device, the external module further configured to cause a module generated signal to be sent by the internal module to the downstream portion upon receipt of the wireless control signal in order to effect a predetermined output by the controllable photographic device.

2. The control system of claim 1, wherein the controllable photographic device, including the controllable device circuit, begins as a preconfigured piece of proprietary photographic equipment designed and/or manufactured by a first company, and wherein a second company modifies the preconfigured piece of proprietary photographic equipment by coupling an internal module with the controllable device circuit.

3. The control system of claim 1, wherein the controlling photographic device is a camera, and the controllable photographic device is a light source.

4. The control system of claim 1, wherein the controllable photographic device is one or more controllable photographic devices selected from the group consisting of:
    a still photographic camera, a video camera, a motion film camera, a camera flash unit, a studio strobe unit, a power flash pack, a constant lighting unit "hot light," an LED array unit, a camera, a light meter, a lighting positioning apparatus, a camera positioning apparatus, a microphone, an audio monitor speaker, head phones, a sound mixing board, an electronic music instrument, audio filtering hardware, video filtering hardware, stage effects, visual effects, pyrotechnic processing equipment, and a pyrotechnic control system.

5. The control system of claim 1, wherein the internal module includes a processor configured to execute one or more instructions, each of the one or more instructions configured to cause the controllable photographic device to execute corresponding preselected actions; and
    wherein the external module includes a memory for storing a license key, the license key configured to determine which if any of the preselected one or more instructions are authorized to be executed.

6. The control system of claim 1, wherein the external module is further configured to couple with a computing device.

7. The control system of claim 6, wherein the coupling is accomplished by means of a USB socket.

8. The control system of claim 1, further comprising one or more discontinuities respectively formed on the one or more control lines between the upstream portion and the downstream portion, and
    wherein the signal directing arrangement includes a first group of one or more lines respectively coupled to the one or more control lines between the upstream portion and the one or more discontinuities, and a second group of one or more lines respectively coupled to the one or more control lines between the downstream portion and the one or more discontinuities.

9. The control system of claim 8, further comprising a switching arrangement electrically disposed between the first group of one or more lines and the second group of one or more lines, the switching arrangement configured to selectively connect either the upstream portion to the downstream portion, or the external module to the downstream portion.

10. The control system of claim 1, wherein:
    the controllable photographic device is a plurality of controllable photographic devices each from a particular one or two or more subsets of controllable photographic devices, each subset of controllable photographic devices having one or more subset specific features that differ from one or more features from another subset of controllable photographic devices;
    the internal module is a plurality of internal modules each from a particular one or two or more subsets of internal modules, wherein each member of a particular subset of internal modules includes subset specific features configured for operable compatibility with any member of a corresponding subset of controllable photographic devices; and
    the external module is a plurality of external modules each configured to electrically and logistically couple with any internal module regardless of which subset of internal modules the internal module is a member of.

11. A preconfigured controllable photographic device modification, the controllable photographic device of the type having preconfigured device circuitry having an upstream portion coupled to a downstream portion via one or more control lines, the modification comprising:
    a wireless signal receiving arrangement configured to recognize receipt of a control signal from a controlling device; and
    a signal directing arrangement configured to interface with the preconfigured device circuitry by being coupled with the one or more control lines between the upstream portion and the downstream portion, the signal directing arrangement configured to send an arrangement generated signal to the downstream portion upon receipt of the control signal from the controlling device, the arrangement generated signal configured to elicit a predetermined response from the controllable photographic device wherein the arrangement generated signal is interpreted by the downstream portion as a preconfigured device signal sent from the upstream portion.

12. The preconfigured controllable photographic device modification of claim 11, further comprising a signal line intercept arrangement coupled with the one or more control lines, and configured to intercept preconfigured device signals intended to pass from the upstream portion to the downstream portion via the one or more control lines.

13. The preconfigured controllable photographic device modification of claim 11, wherein the signal line intercept arrangement is further configured to receive one or more state signals from the downstream portion indicative of a state the downstream portion is in, and to send a corresponding state signal to the upstream portion to achieve a state correspondence between the downstream portion and the upstream portion.

14. The preconfigured controllable photographic device modification of claim 11, further comprising one or more discontinuities respectively formed in the one or more control lines, and a first set of one or more signal lines respectively coupled to the one or more control lines between the upstream portion and the one or more discontinuities, and a second set of one or more signal lines respectively coupled to the one or more control lines between the downstream portion and the one or more discontinuities.

15. The preconfigured controllable photographic device modification of claim 11, wherein the controlling device is a camera, and the controllable device is a light source.

16. The preconfigured controllable photographic device modification of claim 11, wherein the signal directing arrangement is configured to be substantially included in an internal module physically located within an external case of the controllable device, and further comprising an external module configured to be coupled with an external surface of the external case, the external module further configured to receive the control signal from the controlling device and to send a corresponding signal to the internal module.

17. The preconfigured controllable photographic device modification of claim 16, wherein the internal module is a first internal module and is a member of a first internal module subset, each member of the first internal module subset includes first internal module features configured for operable coupling with a first subset of controllable photographic device;
further comprising a second internal module, wherein the second internal module is a member of a second internal module subset, each member of the second internal module subset includes features configured for operable coupling with a second subset of controllable photographic device;
wherein the first internal module features are different than the second internal module features; and
wherein the external module is two or more external modules each configured to logically and electrically couple with either the first or the second internal modules.

18. A method of enabling an intercommunication protocol between a controlling photographic device and two or more controllable photographic devices, the two or more controllable photographic devices including a mix of at least a first design type of controllable device and a second design type of controllable device, the method comprising:
configuring a first set of internal modules each to be electrically and logistically coupled with preexisting circuitry of one or more controllable photographic devices of the first design type;
configuring a second set of internal modules each to be electrically and logistically coupled with preexisting circuitry of one or more controllable photographic devices of the second design type;
configuring each of a plurality of external modules to receive a wireless control signal from the controlling photographic device;
further configuring each of the plurality of external modules to be electrically and logistically coupled with any internal module from either the first set of internal modules or the second set of internal modules in order to enable a module control signal to be sent from the internal module coupled with the external module to the controllable photographic device upon receipt of the wireless control signal by the external module.

19. The method of claim 18, wherein each of the controllable photographic devices includes a device circuit including an upstream portion connected to a downstream portion by one or more control lines, the controllable photographic device configured that such a device signal sent from, or passing from, the upstream side to the downstream side elicits a response from the controllable device; and
wherein the method further comprises:
configuring each of the internal modules to include a processing device to generate the module control signal;
including a signal directing arrangement in each of the internal modules wherein the signal directing arrangement connects the processing device to the downstream portion of the device circuitry; and
configuring the external module to query a status state of the controllable device via the internal module, and to save results of the query with the processing device.

20. The method of claim 19, wherein the status state is one of a battery level, an ambient temperature of the controllable device, and a recycle state.

21. The method of claim 19, further comprising:
determining a signal pattern preconfigured to be sent from the upstream portion to the downstream portion and/or from the downstream portion to the upstream portion;
saving the signal pattern with the processing device; and
at a later time using the signal pattern to elicit the response from the controllable device.

22. The method of claim 18, further comprising:
forming a discontinuity along one or more control lines included in a device circuit of each of the controllable photographic devices, the one or more control lines, prior to the forming of the discontinuity, connecting an upstream portion to a downstream portion of the device circuitry such that, prior to the forming of the discontinuity, a device signal sent from, or passing from, the upstream side to the downstream side would elicit a response from the controllable device; and
coupling one of the internal modules to the one or more control lines between the upstream side and the downstream side.

23. A method of providing a wireless functionality to a controllable photographic device having a preconfigured circuitry adapted to effect one or more predetermined functions of the device, the method comprising:
providing a first module configured to operably interface with the preconfigured circuitry of the controllable photographic device;

retrofitting the first module to the interior of the controllable photographic device;

coupling the first module with the preconfigured circuitry of the controllable photographic device such that the first module may draw power therefrom, and operably interface therewith;

retrofitting the controllable photographic device with a port and operably coupling the first module to the port;

providing a second module adapted for wireless communication with a controlling photographic device and configured to operably interface with the internal module; and coupling the second module with the first module via the port such that the second module may draw power therefrom, and communicate therewith, responsive to wireless communication with the controlling photographic device.

24. The method of claim 23, wherein the wireless communication includes radio communication.

25. The method of claim 24, wherein the radio communication employs one or more of a WiFi protocol and a ZigBee protocol.

26. The method of claim 23, wherein the port penetrates a housing of the controllable photographic device and wherein the second module is an external module that may be selectively attached to the exterior of the controllable photographic device via the port.

* * * * *